United States Patent [19]
Tosaki et al.

[11] Patent Number: 5,989,123
[45] Date of Patent: Nov. 23, 1999

[54] STEERING WHEEL CONTROL APPARATUS FOR A TELEVISION GAME MACHINE

[75] Inventors: Kenji Tosaki; Masanori Kudou, both of Tokyo, Japan

[73] Assignee: Sega Enterprises, Ltd., Tokyo, Japan

[21] Appl. No.: 08/581,519

[22] PCT Filed: May 18, 1995

[86] PCT No.: PCT/JP95/00950

§ 371 Date: Jan. 11, 1996

§ 102(e) Date: Jan. 11, 1996

[87] PCT Pub. No.: WO95/32038

PCT Pub. Date: Nov. 30, 1995

[30] Foreign Application Priority Data

| May 20, 1994 | [JP] | Japan | 6-129898 |
| May 20, 1994 | [JP] | Japan | 6-129899 |
| May 20, 1994 | [JP] | Japan | 6-129900 |
| Jan. 5, 1995 | [JP] | Japan | 7-015515 |

[51] Int. Cl.$^6$ .................................................. A03F 9/22
[52] U.S. Cl. .............................................. 463/37; 463/47
[58] Field of Search ........................ 463/36, 37, 47; 434/62, 29, 30, 71

[56] References Cited

U.S. PATENT DOCUMENTS

| 4,494,754 | 1/1985 | Wagner, Jr. | 273/148 B |
| 4,509,383 | 4/1985 | Yeh | 463/38 |
| 4,887,966 | 12/1989 | Gellerman | 463/38 |

FOREIGN PATENT DOCUMENTS

| 2098392 | 4/1990 | Japan . |
| 8400524 | 2/1984 | WIPO . |
| 8911704 | 11/1989 | WIPO . |

Primary Examiner—Valencia Martin-Wallace
Assistant Examiner—James Schaaf
Attorney, Agent, or Firm—Price Gess & Ubell

[57] ABSTRACT

The present invention relates to a steering wheel control apparatus for a television game machine, that is used for a car race game, etc., that is structured compactly and simply, and that can be operated while the apparatus is fixed at an optimal position. The feature of the steering wheel control apparatus is that a plurality of button switches transmitting game control signal are provided on a surface of upper posts between a center portion of a steering wheel and hand grips on each side thereof, within a range to which a thumbs of player's hand holding the grip without departing from the grips. Further, at the reverse of the center portion of the steering wheel, shift levers having operation points near the respective grips are provided. The side face of a base casing rotatably supporting the steering wheel is extended perpendicularly and to the front and to the rear so that the player can securely hold the base case between the thighs. In addition, the steering wheel control apparatus includes a structure for adjusting the angle and the height of the steering wheel.

35 Claims, 24 Drawing Sheets

STEERING WHEEL CONTROL APPARATUS FOR A TELEVISION GAME MACHINE

FIELD OF THE INVENTION

The present invention relates to a steering wheel control apparatus that is connected to a home television game machine by a cable or by radio and that is manipulated by a player.

BACKGROUND OF THE INVENTION

Conventional television game machines that simulate the operations of vehicles, such as automobiles, airplanes and ships, are used as is shown in FIG. 1, for example.

More specifically, a television game machine 1 transmits video image signals and speech signals to a television set 2, via a cable, for a game program that is contained in a game cartridge, which is installed in the television game machine 1, and thus provides a game on the television set 2. A steering wheel control apparatus 3 for a car race game is connected to the television game machine 1 and outputs a drive signal to the television game machine 1 to control the game.

In the steering wheel control apparatus 3, its body 4 corresponds to the instrument panel of an automobile, and a steering wheel 6 is attached to the distal end of a steering shaft 5, which is so provided that it projects diagonally upward from the body 4.

During the game, the player needs only manipulate the steering wheel control apparatus 3, while the steering wheel control apparatus 3 is placed either on a table 7, as is shown in FIG. 1, or directly on a floor. In addition, when the player sits on a sofa, etc., to play a game, he can place the steering wheel control apparatus 3 on his lap. Under such conditions, the player commonly manipulates a button switch or a shift lever (not shown), which are provided on the body 4, while operating the steering wheel 6.

Such a conventional steering wheel control apparatus, however, does not provide excellent usability, and has the following shortcomings.

The first problem is concerned with the positions of the various switches that are located on a steering wheel control apparatus. More specifically, for the television game machine that simulates the operations of vehicles, such as cars, airplanes and ships, by manipulating a steering wheel while watching a monitor screen, in addition to a steering wheel, which is employed to indicate the direction of travel, a steering wheel control apparatus normally includes various switches that are mounted on the body. There are steering apparatuses that resemble a control stick for an airplane, where one push button switch is provided on the top of the control stick or where a button switch is provided on the reverse side of the control stick.

The above television game, however, requires not only the operation of a steering device to indicate the direction of movement, but also the manipulation of switches for accelerating, for braking and for shifting gears, or for offensive and defensive maneuvering and for changing a field view. As these switches are arranged on the body 4 of the steering wheel control apparatus 3, as is shown in the above prior art, a player must remove one hand from the steering wheel 6 to manipulate the switches during the game, so that prompt reaction is difficult and usability is degraded.

It is possible for a player to hold a steering wheel with one hand and to place the other hand on the switches in advance; however, the driving posture will be uncomfortable and the operation will be carelessly performed.

While, as is described above there are control stick steering devices that have a single button switch, there are no such control apparatuses that have a plurality of switches that can be selected and manipulated while a control stick is being held. The above described control stick steering devices, therefore, are not appropriate for games that require multiple operation switches.

However, if a control apparatus has only one operation switch that is located out of sight, it will not cause any problems during operation. Whereas if there are a plurality of switches that are positioned out of sight, since they are outside the field of vision, when they are used operating errors can occur.

The second problem is related to a gearshift lever that is frequently used during a car race game. Primarily, the operation switch that corresponds to a gearshift lever is attached to the body 4.

Since a player needs to remove one hand from the steering wheel 6 to manipulate a gearshift lever during the game, there is loss of time at the shift operation. Thus, in a car race game in which quick responses are required, a player can not cope with the speed at which the game progresses.

For large game machines that are installed in a game center, etc., gearshift levers are so provided for a steering wheel as to resemble the arrangement for a real racecar. This gearshift lever is called a seesaw gearshift lever, or a so-called a butterfly gearshift lever, which is so designed that a shift-up operation and a shift-down operation can not be performed at the same time.

The butterfly gearshift lever is so designed that it is large and the periphery of the steering wheel is accordingly complicated and does not have an attractive appearance.

The butterfly gearshift lever is not appropriate for installation on a steering wheel control apparatus for home use that must be compactly made.

The third problem arises when, as is shown in FIG. 1, a game is played while the steering wheel control apparatus 3 is positioned on the table 7, and the manipulation of the steering wheel 6 must be performed as quickly as possible for a car racing game, etc. When a player is engaged in such a game, extra force is imposed on the steering wheel 6, with the result that the steering wheel control apparatus 3 is moved.

When the steering wheel control apparatus 3 is moved, it is impossible to control the direction of travel by using the steering wheel 6, and it is necessary to halt the game during play.

As a player must therefore constantly take care not to move the steering wheel control apparatus 3 while handling the steering wheel 6, the player can not concentrate on the game.

The same conditions are encountered when the steering wheel control apparatus 3 is placed on a floor and used. Further, when the steering wheel control apparatus 3 is held on the lap and used, the steering wheel control apparatus 3 is not stably supported and a player has to take so much care not to move the control apparatus 3 that the player can not concentrate on the game that is being played.

Since the player must pay attention to matters other than those concerned with the playing of a game, the player is prevented from concentrating fully on playing the game, and can not, therefore, thoroughly enjoy it.

The fourth problem is related to the position of the steering wheel 6. The steering wheel 6 is fixed in a standard position on the steering wheel control apparatus 3 for a television game machine. When the position of the steering wheel 6 is so fixed, the operation of the steering wheel 6 may be difficult for a player whose size does not correspond to the average, or for a player who has a unique operating posture. To provide realism in the procedures for the game, some conventional control apparatuses 3 vibrate the steering wheel 6 by causing the steering wheel 6 to slide up and down and to be extended upward and retracted. Such a performance is only for causing the vibration, and under normal conditions, when vibration is not required, the steering wheel 6 returns to the standard position, which is not always the position that is appropriate for a player.

DISCLOSURE OF THE INVENTION

It is therefore one object of the present invention to provide a steering wheel control apparatus, for a home television game machine, that is compactly made and has a simple structure, and that overcomes the various operational shortcomings that are detailed above.

It is another object of the present invention to provide a steering wheel control apparatus, for a television game machine, wherewith a player can selectively manipulate a plurality of switches while holding a steering wheel.

To achieve the above objects, according to the present invention, a steering wheel control apparatus, which is employed as control means for a television game machine, comprises: a steering wheel having a predetermined grip; and a plurality of button switches that are so arranged and positioned, at a front location on the steering wheel, as to be accessible when the thumb of a hand with which the grip is held is shifted while the hand is holding the steering wheel.

As a result, a player can selectively manipulate a plurality of button switches while holding the steering wheel. The steering wheel control apparatus, therefore, possesses excellent usability, and is appropriate for television games that require quick control responses. Thus it is possible for games to provide progressively greater gratification for players as skill is acquired in their use, and the players can enjoy the games more.

A plurality of button switches are located at the front of the steering wheel and within sight of the player, so that a player can observe the manipulation of switches and can prevent errors during their operation.

For a rotary steering wheel that has a pair of grip portions, the arrangement of a plurality of button switches on the grip portions can facilitate a more complex and a higher level switch manipulation.

According to the present invention, a switch, such as a game start switch, that is not used during a game is located in the center, or in the vicinity of the center, at the front of the steering wheel. With this arrangement, since to manipulate that switch one hand must be removed from the steering wheel, manipulation errors can be prevented.

It is an additional object of the present invention to provide a steering wheel control apparatus, for a home television game machine, that has a gearshift mechanism that is compactly and simply constructed around a steering wheel and that is appropriate for employment with such a steering wheel control apparatus when it is used with a home television game machine.

To achieve this object, according to the present invention, a steering wheel control apparatus, which is used for a television game machine, comprises: a pair of grip portions that are positioned at predetermined right and left locations on a steering wheel; and a pair of shift levers that are provided on a reverse surface of the steering wheel, with the pair of shift levers having manipulable segments, which are near the pair of grip portions, whereat, when fingers of both hands holding the pair of grip portions are in contact with the manipulable segments, a signal to shift up a gear is generated by actuation of one of the gearshift levers and a signal to shift down a gear is generated by actuation of the other gearshift lever.

Since a steering wheel control apparatus according to the present invention is so designed that the individual shift levers on the reverse surface of a steering handle are operated independently, the shift lever mechanism can be compactly and simply constructed around the steering wheel, and is appropriate for employment with the steering wheel control apparatus for home use. Even with a television game that is played at home, a player can enjoy a sense of control that is similar to that which is experienced when actually driving a racecar.

A signal processing means for processing signals from the shift levers is provided so that, even when both the shift levers are being operated, it is assumed that the control that is imposed by one of the gearshift levers is valid and that the result of the operation of the other is invalid. Errors that occur during the operation of the gearshift levers can be automatically eliminated. Further, the control apparatus can be thus fixed in place, and the operation of the apparatus that has button switches and the shift levers on the obverse and reverse sides of the steering wheel can be performed perfectly.

It is a further object of the present invention to provide a steering wheel control apparatus, for a television game machine, that a player can easily and securely fix in place so that the player does not have to take special care not to move the control apparatus while engaged in playing a game.

To achieve this object, according to the present invention, with a steering wheel control apparatus, which is used for a television game machine, a base casing that rotatably supports a steering shaft for a steering wheel has sides that are extended perpendicularly and substantially forward and backward so that the sides can be easily held between player's thighs.

Since a player can securely hold the base casing between the thighs, and the player does not, therefore, have to be careful about shifting the steering wheel control apparatus unnecessarily while manipulating the steering wheel, when engaged in a game, the player can concentrate on and fully enjoy playing the game.

A plate is extended to the right and to the left along the bottom face of the base casing. The player can hold the base casing between the thighs, and at the same time, can press down on the plate, which extends outward to either side, with the thighs from above, so that the base casing can be held more securely.

It is still another object of the present invention to provide a steering wheel position adjustment structure, of a steering wheel control apparatus for a television game machine, that permits a steering wheel to be moved to an optimal operating position for a player.

To achieve this object, according to the present invention, a steering wheel position adjusting structure, of a steering wheel control apparatus that is used for a television game machine, comprises: a steering column for rotatably supporting a steering wheel; a base casing that pivots and permits the steering column to be freely inclined; temporary holding means for permitting the steering column to be inclined and for temporarily holding the steering column at a desired position; and locking means for inhibiting an inclination of the steering column.

When the locking means has been released, the steering column is temporarily held by the temporary holding means so that it can be inclined. The steering column is freely inclined by moving a steering wheel and can be maintained at a proper inclination. Then, the steering wheel can be secured in an optimal inclined position by setting and locking the locking means.

In the temporary holding means, the external bottom wall face of the steering column is virtually formed in a curved shape, and a plurality of grooves that extend toward the sides are formed along the circumference of the curved face. An engagement member is formed that extends outward from the base casing and that has an engagement protrusion at its distal end, which is displaced downward by elastic deformation. When the engagement protrusion engages one of the grooves in the steering column, the inclined steering column is temporarily held at that position. In the locking means, the active portion of an inclination locking member, which is provided for the base casing, can be freely engaged downward with, and disengaged from the engagement protrusion. When the active portion of the inclination locking member engages the engagement protrusion, the locking means inhibits the downward displacement of the engagement protrusion and thus provides the locked state. When the active portion of the inclination locking member is separated from the engagement protrusion, the locking means permits the downward displacement of the engagement protrusion and thus provides the lock released state.

With this arrangement, if the locking is released by operating the inclination locking member, the downward displacement of the engagement protrusion is permitted. In this condition, when the steering column is inclined, at its distal end the engagement protrusion is disengaged from the groove in the steering column by the elastic deformation of the engagement member, and engages another groove, after sliding over the cylindrical portion between the grooves, to hold the steering column temporarily.

In the lock released state, the steering column can be freely inclined by moving the steering wheel and can be temporarily held at a desired position. Further, when the inclination locking member is operated and it is set in the locked state, the downward displacement of the engagement protrusion is inhibited. The engagement protrusion is therefore securely fitted in the groove in the steering column and the inclination of the steering wheel is fixed.

In addition, to achieve the above object, according to the present invention, a steering wheel position adjusting structure, of a steering wheel control apparatus that is employed for a television game machine, comprises: temporary holding means for extending or depressing a steering shaft, which is integrally formed with a steering wheel and for temporarily holding the steering shaft at a desired position; and locking means for inhibiting the steering shaft from being extended or depressed.

When the locking means is set in the lock released state, the steering shaft is temporarily held by the temporary holding means so that it can be freely extended or depressed. The steering shaft can therefore be freely extended or depressed with the steering handle and can be temporarily maintained at a desired height. When the steering shaft is locked by the locking means, the steering wheel can be fixed at an optimal vertical position.

For the temporary holding means, a plurality of grooves that extend in a direction that is perpendicular relative to the axial direction of the steering shaft are formed in the surface of and around the steering shaft. An engagement piece is provided on the end of a cylindrical engagement member that engages the steering shaft, which can be freely extended and depressed in the axial direction, and that rotates with the steering shaft. The engagement piece can be displaced by the elastic deformation in the direction of the greatest diameter of an inward protruding engagement pawl that is provided at the distal end of the engagement piece. When the engagement pawl engages one of the grooves in the steering shaft, the extension/depression position of the steering shaft is temporarily determined. In the locking means, a circular extension/depression locking member, which rotatably engages the end of the cylindrical engagement member, is so operated that the active portion of the extension/depression locking member can be externally connected to, or disconnected from, the engagement piece of the engagement member. And the cylindrical engagement member is rotatably supported by the steering column. When the active portion of the extension/depression locking member contacts the engagement piece of the engagement member, the expansion of the diameter of the engagement piece is inhibited and the engagement member is locked in place. When the active portion of the extension/depression locking member is separated from the engagement piece of the engagement member, the expansion of the diameter of the engagement piece is permitted and the locked state is released.

When the locking condition is released by the operation of the extension/depression locking member, the displacement of the engagement pawl in the direction in which the diameter is expanded is permitted. Under this condition, when the steering shaft is extended or depressed, the engagement pawl at the end is removed from the groove in the steering shaft by the elastic deformation of the engagement piece, and engages another groove after sliding over the side face between the grooves, so that the steering shaft is thus temporarily held.

As is described above, in the lock released state, the steering shaft can be freely extended and depressed with the steering wheel, and can be temporarily held at a desired position. Further, since, in the locked state that is provided by the operation of the extension/depression locking member, the displacement of the engagement piece is inhibited in the direction in which the diameter is expanded, the engagement pawl is securely fitted into the groove of the steering shaft and the vertical position of the steering wheel is fixed.

The inclination and the extension/depression of the steering wheel can be adjusted by the provision of the steering wheel inclination position adjustment structure and the steering wheel extension/depression position adjustment structure.

According to the present invention, a plurality of button switches are provided above and on the right and the left sides at given positions on a steering wheel, and a gearshift lever pair is arranged on the reverse side. While a steering wheel is being handled, these button switches and the gearshift lever pair can be manipulated by the thumbs and the other fingers. In addition, for increased usability, the base casing of the steering wheel control apparatus can be securely positioned by its being held between the thighs of a player. Further, since the vertical position and the rotational position of the steering wheel can be adjusted, a player can more easily handle the steering wheel while manipulating the button switches and the gearshift levers.

BRIEF DESCRIPTION OF THE DRAWINGS

The accompanying drawings are provided as reference material for enhanced comprehension of the present inven

BEST MODES FOR CARRYING OUT THE INVENTION

Outline of a steering wheel control apparatus

Figure 2:
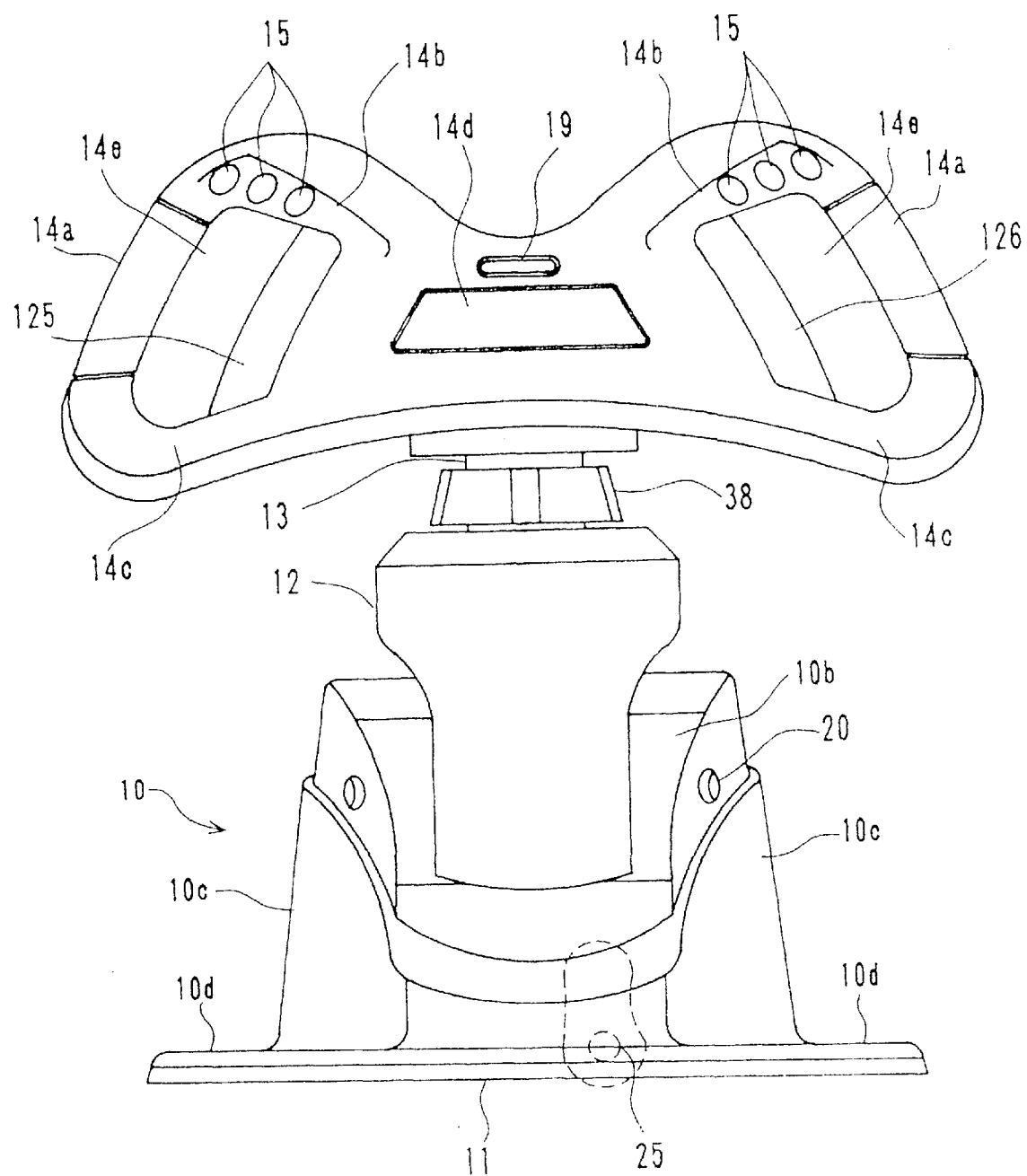
FIG. 2 is a rear view of a steering wheel control apparatus according to one embodiment of the present invention.
Figure 3:
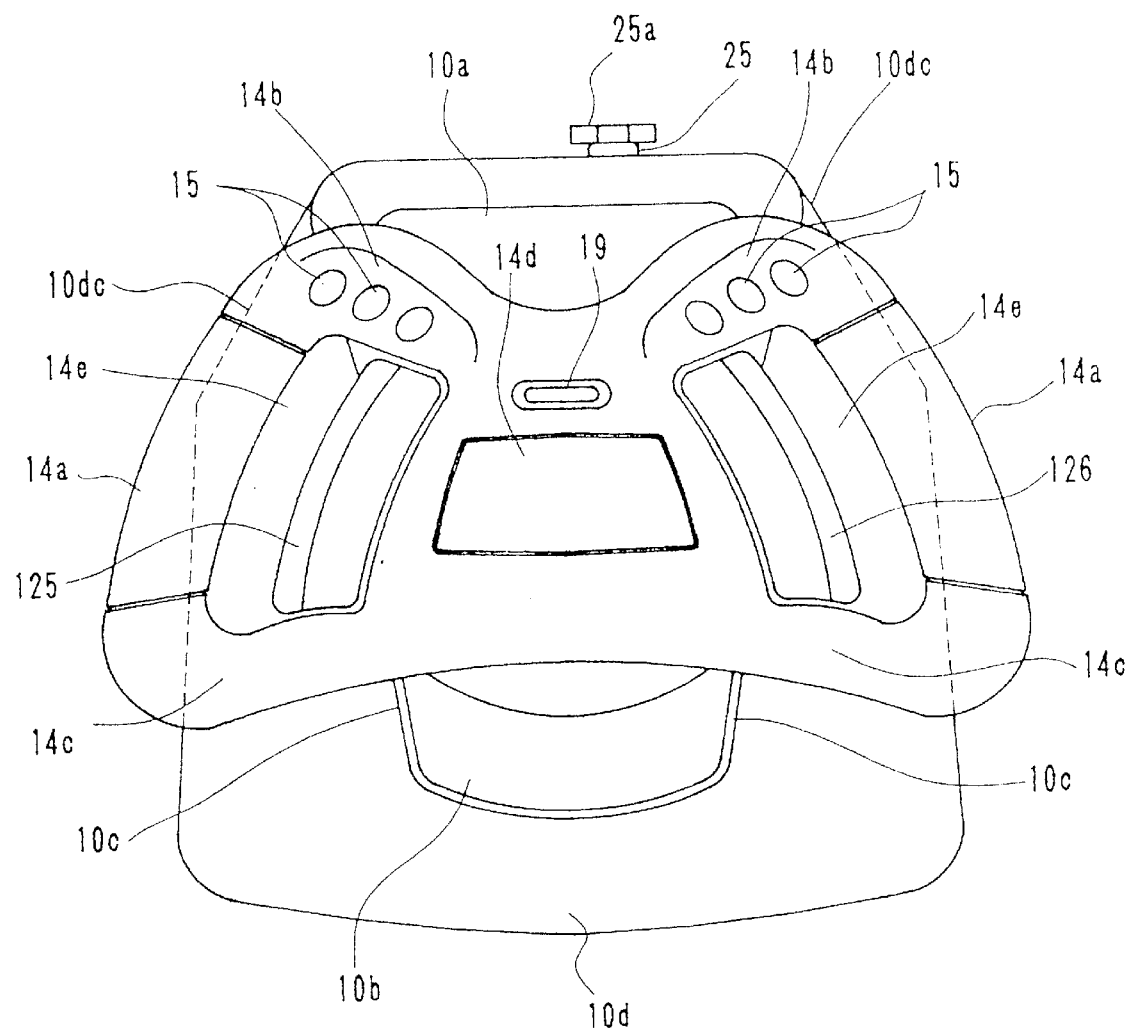
FIG. 3 is a top view of a steering wheel control apparatus according to the embodiment of the present invention.
Figure 4:
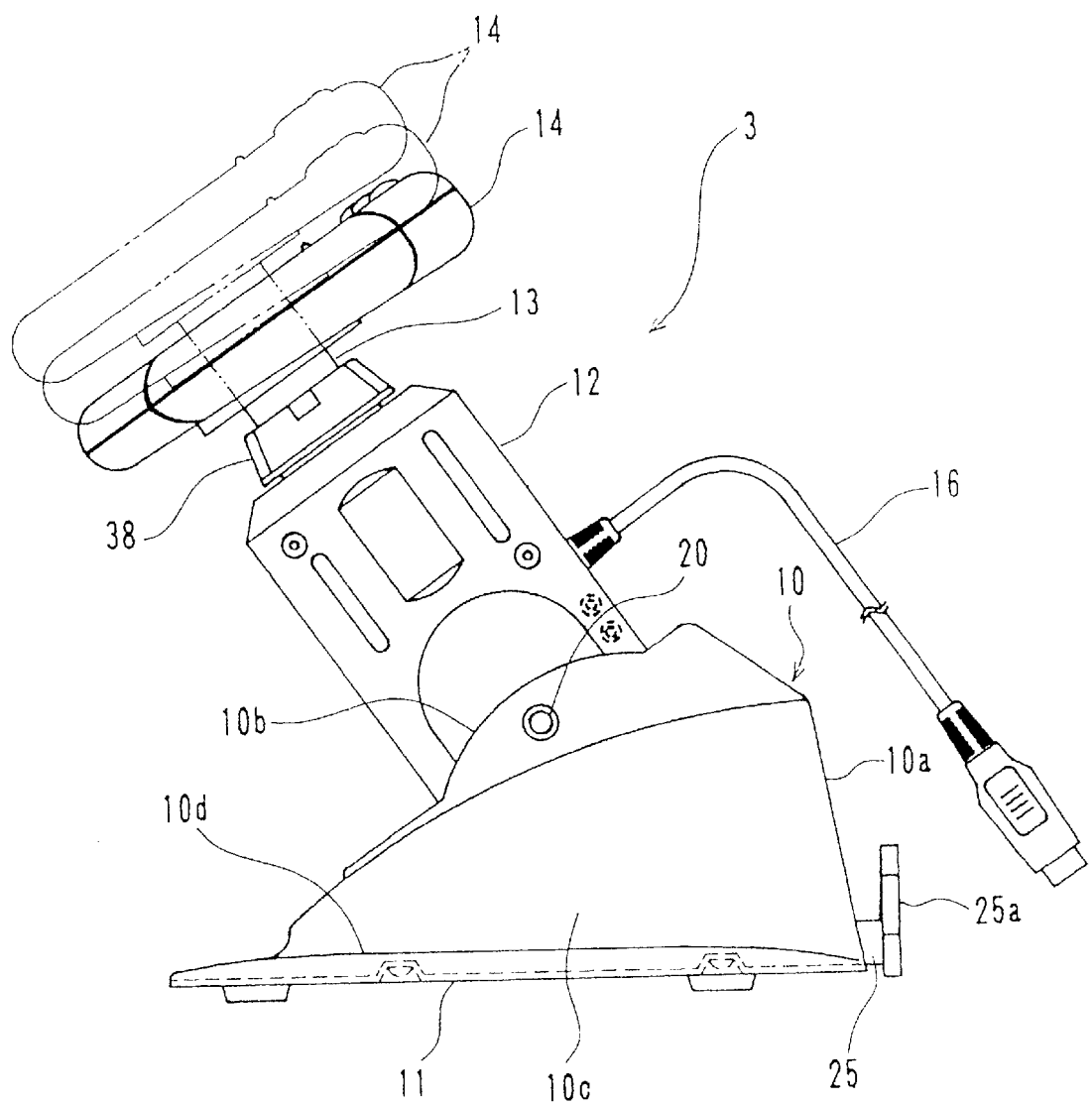
FIG. 4 is a side view of a steering wheel control apparatus according to the embodiment of the present invention.

FIGS. 2 through 4 are a rear view, a top view and a side view for a steering wheel control apparatus according to one embodiment of the present invention.

Figure 1:
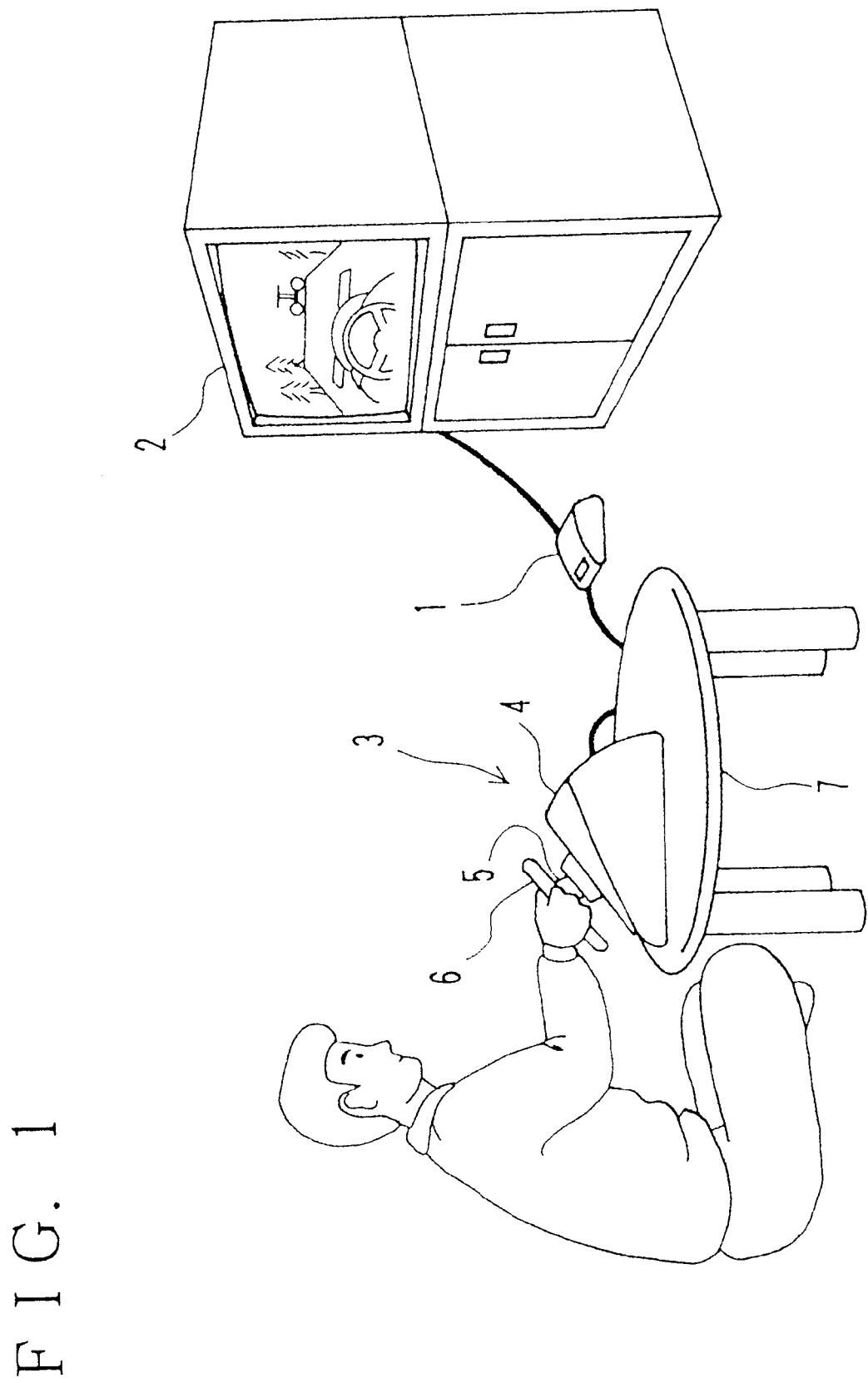
- FIG. 1 is a sketch illustrating a conventional steering wheel control apparatus that is being used.

The steering wheel control apparatus of the embodiment is employed by being connected to a home television game. As is shown in FIG. 1 for the prior art, a television game machine 1 transmits an image signal and a speech signal to a television 2 to develop a game. A steering wheel control apparatus 3 according to the embodiment, which is used for a driving game, such as a car racing game, is connected for control to the television game machine 1 via a cable 16, and outputs drive control signals to the television game machine 1 to control the progress of the game. In this embodiment, the steering wheel control apparatus 3 may also output the drive control signals to the television game machine 1 through radio.

A player needs only to operate the steering wheel control apparatus 3, and may use it by placing it on a table 4, as is shown in FIG. 1, or directly on a floor.

The player installs a software cartridge for a driving game, such as a car racing game, in the television game machine 1, holds a steering wheel 14 of the steering wheel control apparatus 3, and starts the game.

For a car racing game, a scene representing a race track as it is viewed from the operator's seat of a racecar and that includes images representing competitors' cars appears on a television 2 that is in front of the player. The video scene changes in response to the manipulation of the driving controls, so that the player is given the sense of driving as a participant in a car race.

The basic structure of the steering wheel control apparatus 3 in this embodiment will now be explained.

For a base casing 10 of the steering wheel control apparatus 3, an upright front wall 10a inclines slightly to the rear up to its top rear edge, a top wall 10b is formed so that it inclines diagonally downward to the rear until it reaches a bottom wall and thus serves as a rear wall, and side walls 10c cover the right and the left sides.

The side walls 10c approach each other as they extend to the rear.

The lower ends of the side walls extend horizontally to the right and left, and the rear edge of the top wall 10b extends backward horizontally so together they form a single plate 10d. The plate 10d is substantially rectangular in shape and creping is performed on the surface.

The lower face of the base casing 10 is covered with a bottom plate 11.

A cylindrical steering column 12 is fitted to an opening in the center of the inclined top wall 10b, and a steering shaft 13 is inserted into the steering column 12 to rotatably support the shaft 13. A steering wheel 14 is integrally formed at the upper end of the steering shaft 13 that projects upward.

The steering wheel 14 extends to the right and to the left and has hand grips 14a at the edge portions. These grips 14a are formed via upper and lower posts 14b and 14c that extend radially to the right and to the left from the steering wheel center portion 14d. Three push button switches 15 are arranged on the upper post 14b that is located in front of each of the grips 14a. Gearshift levers 125 and 126 that control gears during a car racing game are provided on the rear side of the steering wheel 14, so that the operating portion for each of the gearshift levers 125 and 126 is positioned in an arched opening 14e that lies between the steering wheel center portion 14d and the hand grip 14a. Another button switch 19 is located above the steering wheel center portion 14d.

A cable 16 that extends from the steering column 12 is connected to the television game machine 1.

The steering wheel control apparatus 3 in the embodiment has the above described appearance and its base casing 10 is formed in the above shape. To use such a steering wheel control apparatus 3, as will be explained while referring to FIG. 9, a player who is seated on, a piece of furniture, such as a sofa, places the steering wheel control apparatus 3 between the thighs. Then, while holding the side walls 10c of the base casing 10 with the thighs, at the same time the player sandwiches the horizontally extending plate 10d between the thighs and the seat so as to stabilize the steering wheel control apparatus 3.

Button switches on the steering wheel control apparatus

Figure 5:
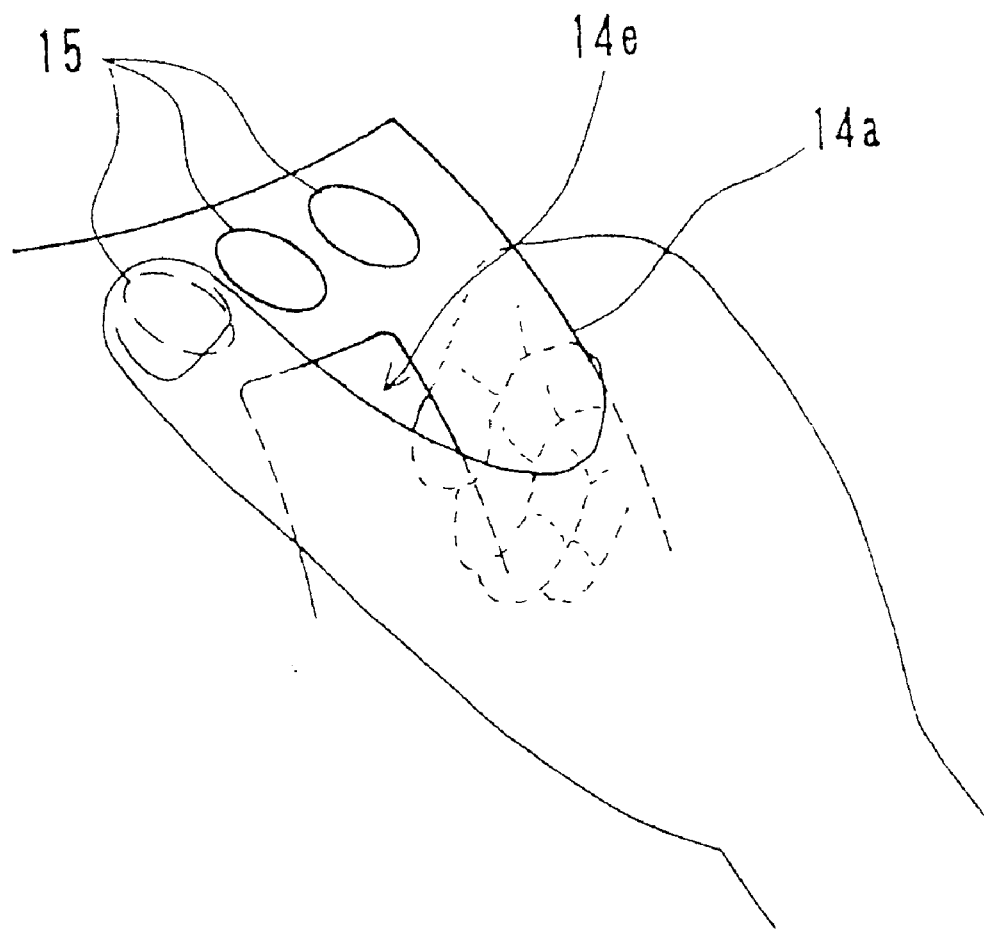
FIG. 5 is a sketch illustrating a right hand holding the right grip portion of the steering wheel in FIGS. 2, 3 and 4.

In FIG. 5 is shown the state when the right hand grip 14a is held by the right hand. The hand grip 14a can be securely held with the fingers, except for the thumb, and the proximal joint of the thumb. The three push button switches 15 are so arranged that they lie within a range where the thumb can move freely, and especially at positions where the pad of the right thumb (the palmar surface of the thumb where the curved ridges that produce a fingerprint are located) can easily be brought into contact with the buttons 15. Though not shown, the three push button switches on the left side are also arranged at the positions where the pad of the left thumb can easily be brought into contact with the button switches while the left hand holds the hand grip 14a.

A player, therefore, can selectively depress the switches in the two three push button sets with the right or the left thumb, while exercising control by securely holding the hand grips 14a with both hands.

On the other hand, the push button switch 19 that is located above the steering wheel center portion 14d can not be depressed unless one or the other of the hands releases a hand grip 14a.

The push button switches 15 and 19 are located on the front face of the steering wheel 14 that is in sight of an operator with a common posture. In addition, the button switches 15 are located on either upper posts 14b between the right and left hand grips 14a . Therefore, a player can look at these button switches 15 while depressing them with the thumbs and without releasing the hand grips.

An example where the present invention is applied to a car racing game will now be explained.

In this game, acceleration, braking, gear changing and jumping can be performed, and an image on a television screen can be altered so that a scene can be viewed from various angles.

Various viewing angles can be selected: an angle at which an operator is commonly looking straight forward from an operator's seat; an angle at which an operator is looking to the rear; and an angle for a view point that is different from the view from the view point of the operator and that is upward and diagonally to the rear of the car.

Among the three push button switches 15 on the right side, the rightmost bush button switch is an acceleration switch, the middle push button switch is a brake switch, and the leftmost push button switch is a jump switch. These switches are manipulated frequently during the game. While the hand grip 14a is held by the right hand, the right thumb can be employed to selectively depress the push button switches 15.

Among the three push button switches 15 on the left side, the leftmost push button switch is, for example, a gear change switch and the other two are switches for changing the view angle. While the hand grip 14a is held by the left hand, the left hand thumb can be employed to selectively depress the three push button switches 15.

The push button switch 19 that is located above the steering wheel center portion 14d is a game start switch.

After a player starts the game by depressing the push button switch 19 that is above the steering wheel center portion 14d, the player grasps the hand grips 14a with both hands, controls the steering wheel 14 for driving while watching the image on the television screen, and selectively employs his thumbs to depress the three push button switches 15 on either side without releasing either hand from the hand grips 14a. Thus, usability is excellent and quick operating responses are possible; and as the player gains proficiency, his enjoyment of the game increases.

The thumb of the right hand, especially, is frequently employed in consonance with race conditions to change the driving speed or to make a jump, so that a player's skill is best demonstrated by its use.

The gear change switch that is depressed by the thumb of the left hand is used rather frequently. The remaining push button switches, which are employed to change the view angle, are operated to acquire information about the position of the player's car and about how the race is progressing.

Since the push button switches that are to be depressed by the thumbs can be visually identified, erroneous selections can be avoided.

Further, since the push button switches are located within the range where the thumbs of the hands on the hand grips can contact them, not much space for the installation of these switches is required and the periphery of a steering wheel can be compactly designed.

On the other hand, as there is no need to depress the push button switch 19 during a game, and since if the switch 19 is mistakenly depressed it will cause an annoying interruption, i.e., the halting of the game, the switch 19 is so positioned that a hand must be removed from a grip to depress it in order to prevent it from being mistakenly depressed.

Shift levers for the steering wheel control apparatus

Conventionally, multiple operating switches of various types are provided for the base casing 10 of the steering wheel control apparatus 3, and a switch for instructing the shifting of a gear in a game is also provided on the base casing 10. In the steering wheel control apparatus 3 of this embodiment, the shift levers 125 and 126 are provided for the steering wheel 14.

The driving mechanism of the shift levers 125 and 126 will be described while referring to FIGS. 6 and 7.

Figure 6:
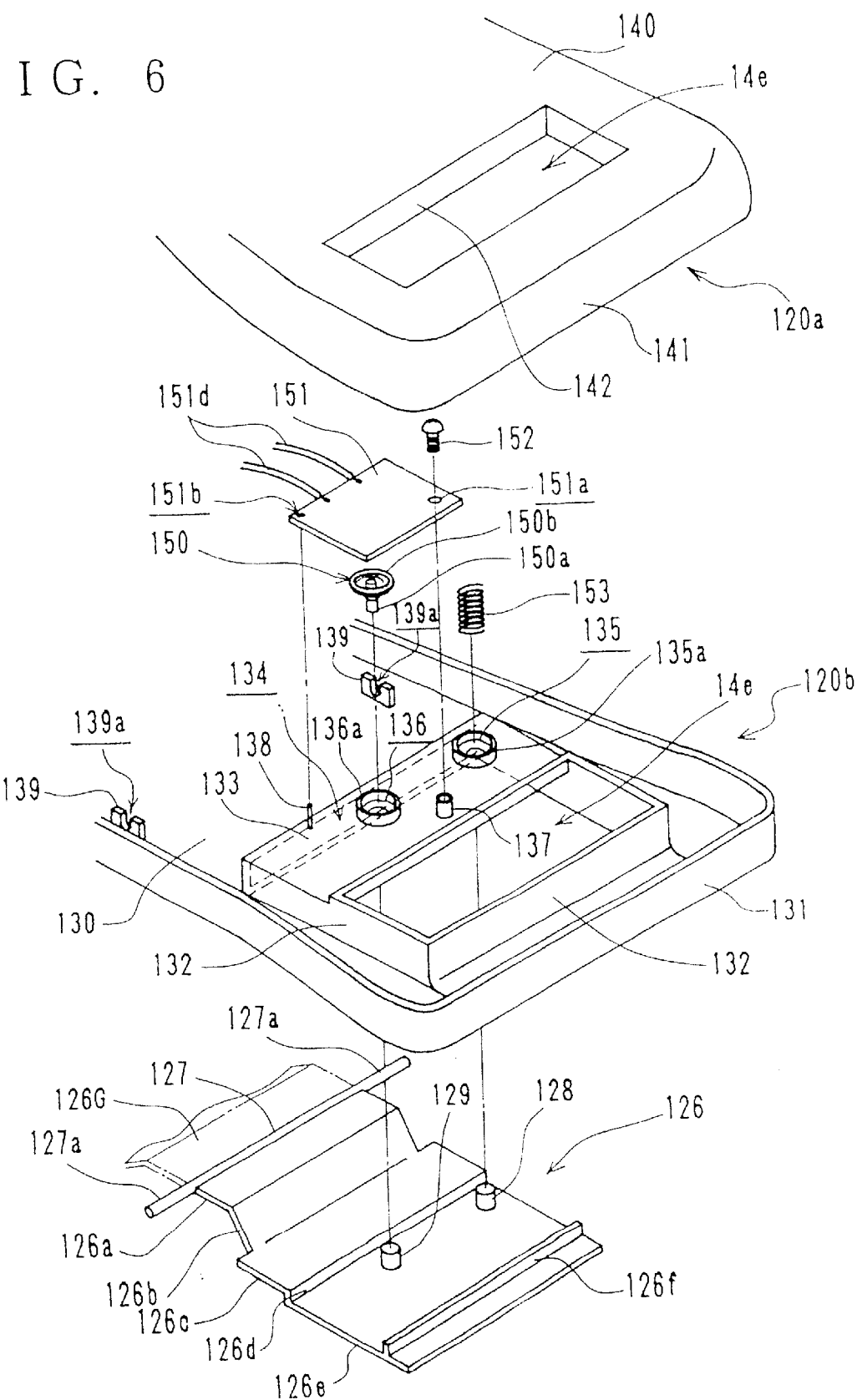
FIG. 6 is a partially exploded perspective view of a steering wheel showing a gearshift lever according to the embodiment of the present invention.
Figure 7:
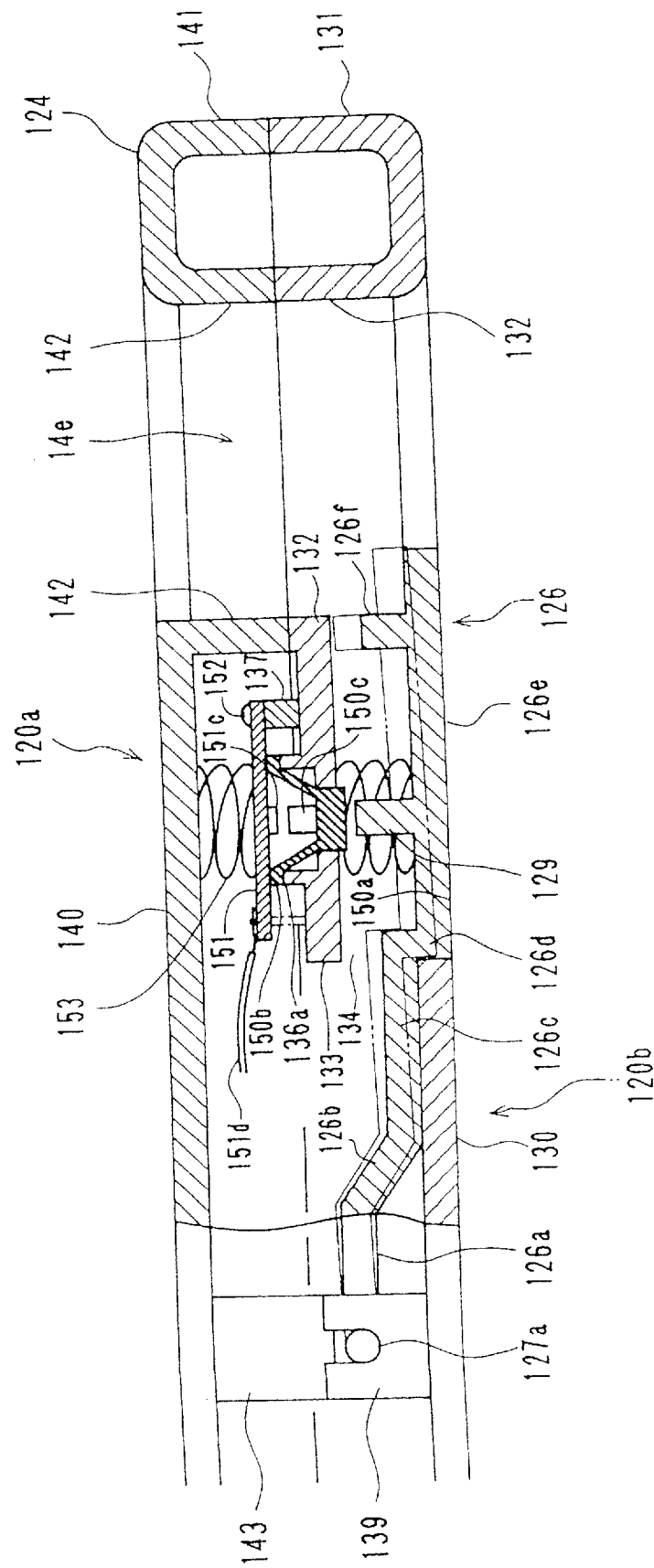
FIG. 7 is a partial cross sectional view of the steering wheel in FIG. 6.

In FIGS. 6 and 7 is shown the structure of the right shift lever 126; the left shift lever 125 has the same structure. The right shift lever 126 is used to instruct a shift up and the left shift lever 125 is employed to instruct a shift down.

The steering wheel 14 is constituted by joining casings 120a and 120b that are an obverse half and a reverse half (an upper half and a lower half), which are substantially symmetrical.

In the reverse side casing 120b, the circumference of a bottom wall 130 is enclosed within an external wall 131 and an internal wall 132 that is formed around the opening 14e.

One part of the bottom wall 130 projects inward (upward) along the internal wall 132, at the opening 14e, which is near the center, to form a recessed rectangular step wall 133. At the front and the rear of the step wall 133 are side walls that extend the front and the rear internal walls 132. In the center of the step wall 133, a perpendicular rectangular opening 134 is formed that extends longitudinally to the front and to the rear.

Circular holes 135 and 136 that are positioned in line are provided in the step wall 133, and upright cylindrical portions 135a and 136a are provided around the circular holes 135 and 136, respectively.

A boss 137, in which a screw hole is formed, and a pin 138 project upward near the rear circular hole 136.

A pair of bearings 139 are located upright on the bottom wall 130 at a position that faces a rectangular opening 134. The paired bearings 139 are rectangular pieces that face each other, and that have a recess 139a formed in each upper edge.

In the obverse side casing 120a, to correspond to the reverse side casing 120b, a bottom wall 140 is enclosed within an external wall 141, and an opening 14e is defined by an internal wall 142. A pair of front and rear pressure pieces 143 that correspond to the bearings 139 project downward from the bottom wall 140.

A rubber contact piece 150 is fitted into and around the cylindrical portion 136a of the step wall 133 in the reverse side casing 120b. The cone shaped rubber contact piece 150 is inserted into the cylindrical portion 136a with a distal cone end 150a facing downward. A flange 150b at its circumference is positioned and supported on the upper edge of the cylindrical portion 136a and a rectangular switch base plate 151 is pressed against it.

The switch base plate 151 includes circular holes 151a and 151b that are located at diagonally facing corners. The upper end of the pin 138 is fitted into the circular hole 151b, while a screw 152 is fitted into the other circular hole 151a and into the boss 137. The switch base plate 151 is thus fixed to the casing 120b while pressing against the rubber contact piece 150.

Electric cords 151d extend from the switch base plate 151.

A tactile or a micro switch may be employed instead of the rubber contact 150.

As is shown in FIG. 7, the distal end portion 150a of the rubber contact piece 150 projects downward a little through the circular hole 136, and a contact terminal 150c is provided on the reverse side of the distal end portion 150a.

A contact terminal 151c is located on the switch base plate 151 opposite to the contact terminal 150c. When the distal end portion 150a of the rubber contact 150 is pushed up from below and elastic deformation moves the contact terminal 150c upward and brings it into contact with the contact terminal 151c, the switch is turned on.

A spring 153 is inserted in the cylindrical portion 135a on the step wall 133.

With this arrangement, the shift lever 126 is attached under the step wall 133, for which the rubber contact piece 150 and the spring 153 are provided.

The shift lever 126 is formed as though a rectangle plate were folded to form three steps, as is shown in FIG. 6. Assuming that the left side is the base end side, a base end horizontal portion 126a; an inclination portion 126b, which is folded diagonally downward; a horizontal center portion 126c, which is so folded that it runs horizontally; a perpendicular portion 126d, which is folded vertically downward; and a horizontal distal end portion 126e, which is so folded that it runs horizontally, are formed in the named order from the base end toward the opposite, the distal end.

A rotary shaft 127 is securely attached to the edge of the base end horizontal portion 126a. The projecting ends 127a are rotatably fitted into the recesses 129a in the bearings 139. The horizontal center portion 126c, which the bottom wall 130 of the casing 120b contacts, is located at a position that is one step lower than the base end horizontal portion 126a and the inclined portion 126b is between them. The horizontal distal end portion 126e is located at the position that is lower by the thickness of the bottom wall 130 than the horizontal center portion 126c, and the perpendicular portion 126d is between them (see FIG. 7).

The positions of cylinders 128 and 129, which project upward from the distal end horizontal portion 126e, correspond to the positions of the circular holes 135 and 136 in the step wall 133 of the casing 120b, and a vertically elongated stopper 126f is provided outward of the cylinders 128 and 129.

To assemble the shift lever 126, the base end horizontal portion 126a is inserted into the rectangular opening 134 below the step wall 133 of the reverse side casing 120b, and both ends 127a of the rotary shaft 127 are fitted into the recesses 139a of the bearings 139. Then, as is shown in FIG. 7, the horizontal center portion 126c rests on the bottom wall 130, the perpendicular portion 126d extends outward from the rectangular opening 134, and the distal end horizontal portion 126e lies in the same plane as the bottom wall 133, while the distal end of the portion 126e projects slightly into the opening 14e.

The cylinder 129 stands opposite the distal end portion 150a of the rubber contact 150, which is exposed and extends downward through the circular hole 136. The other cylinder 128 stands opposite the circular hole 135.

The stopper 126f is opposite the inner edge of the internal wall 132 along the opening 14e.

When the spring 153 is inserted into the cylinder 135a around the edge of the circular hole 135 and the distal end reaches the horizontal portion 126e of the lower shift lever 126, the cylinder 128 is inserted into the spring 153 to serve as the core for the spring.

When the obverse side casing 120a is coupled with the thus structured reverse side casing 120b, the external walls 131 and 141 and the internal walls 132 and 142 abut against each other and form a continuous surface. The ends 127a of the rotary shaft 127 of the shift lever 126 are pressed down lightly, so that presser pieces 143 and the bearings 139 are slightly shifted relative to each other and overlapped, and the position of the rotary shaft 127 is so fixed that it can be rotated.

The spring 153 is situated between the obverse casing 120a and the shift lever 126 and pushes the shift lever 126 down.

Therefore, the shift lever 126 can swing vertically around the rotary shaft 127, and when no external force is applied, the shift lever 126 is driven down by the spring 153 so as to provide a surface that is in the same plane as the reverse side casing 120b of the steering wheel, as is indicated by the solid lines in FIG. 7. When the end (operating point) of the distal end horizontal portion 126e, which extends slightly into the opening 14e of the shift lever 126, is pushed upward, as is indicated by the chain double-dashed line in FIG. 7, the shift lever 126 is raised against the downward pressure that is exerted by the spring 153. The cylinder 129 pushes the distal end portion 150a of the rubber contact 150 upward so that the contact terminal 150c is brought into contact with the contact terminal 151c on the switch base plate 151 and the switch is turned on.

The stopper 126f abuts upon the step wall 133 to prevent unnecessary movement of the shift lever.

Although only the driving mechanism for the right shift lever 126 has been explained, the driving mechanism for the left shift lever 125 is the same. When the control apparatus is actually operated by a player, the player grasps both hand grips 14a of the steering wheel 14 to rotate the steering wheel 14, and to operate the shift levers 125 and 126, places the fingers other than the thumbs at points where they may be lifted.

The right shift lever 126 may be operated to shift up, while the left shift lever 125 may be operated to shift down.

Although the right and left shift levers 125 and 126 are independently provided in this embodiment, according to another embodiment of the present invention, the right and left shift levers may be integrally formed. That embodiment will now be explained while referring to FIGS. 23 and 24.

Figure 23:
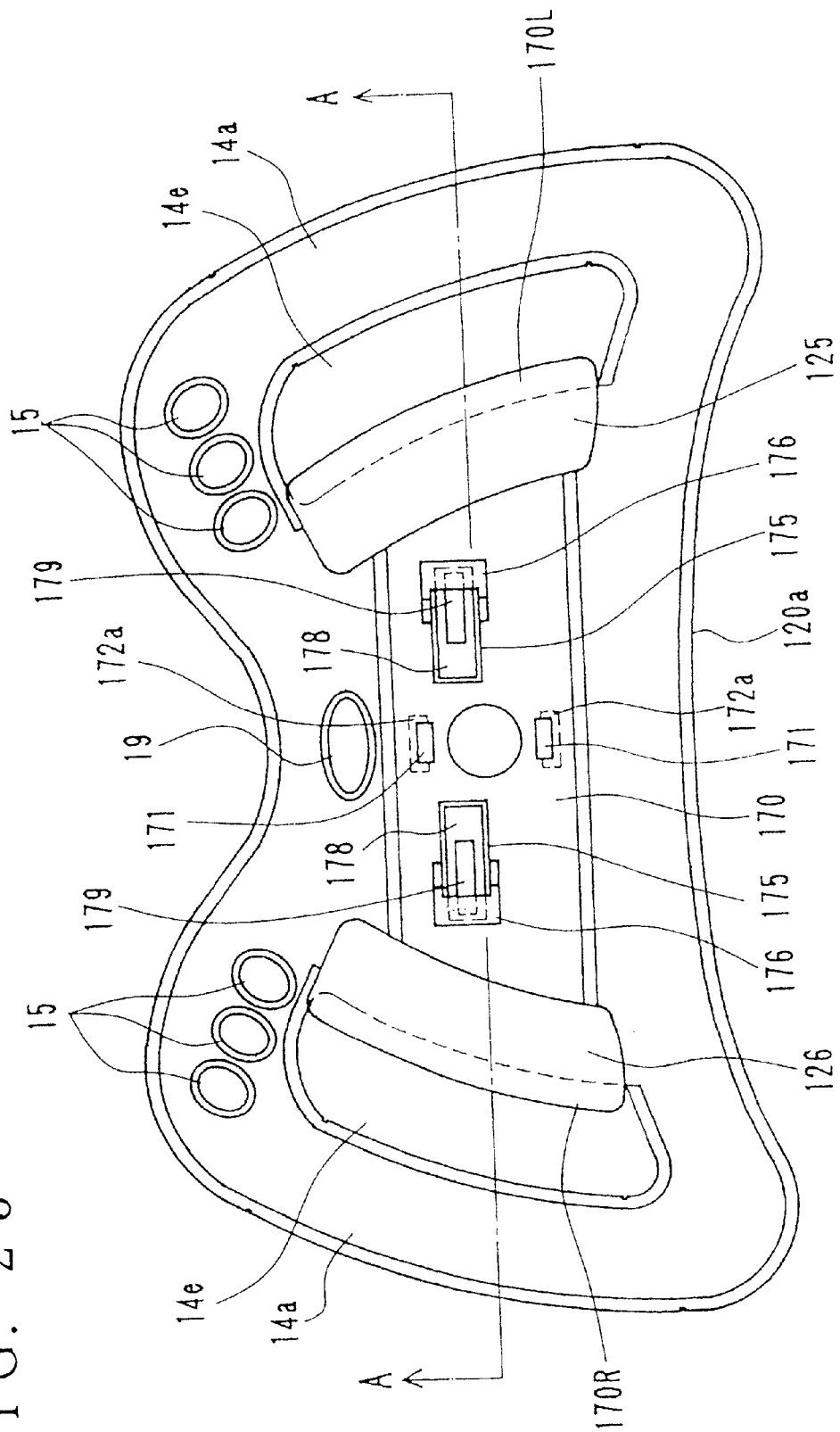
FIG. 23 is an exploded diagram of a steering wheel showing shift levers according to still another embodiment of the present invention.
Figure 24:
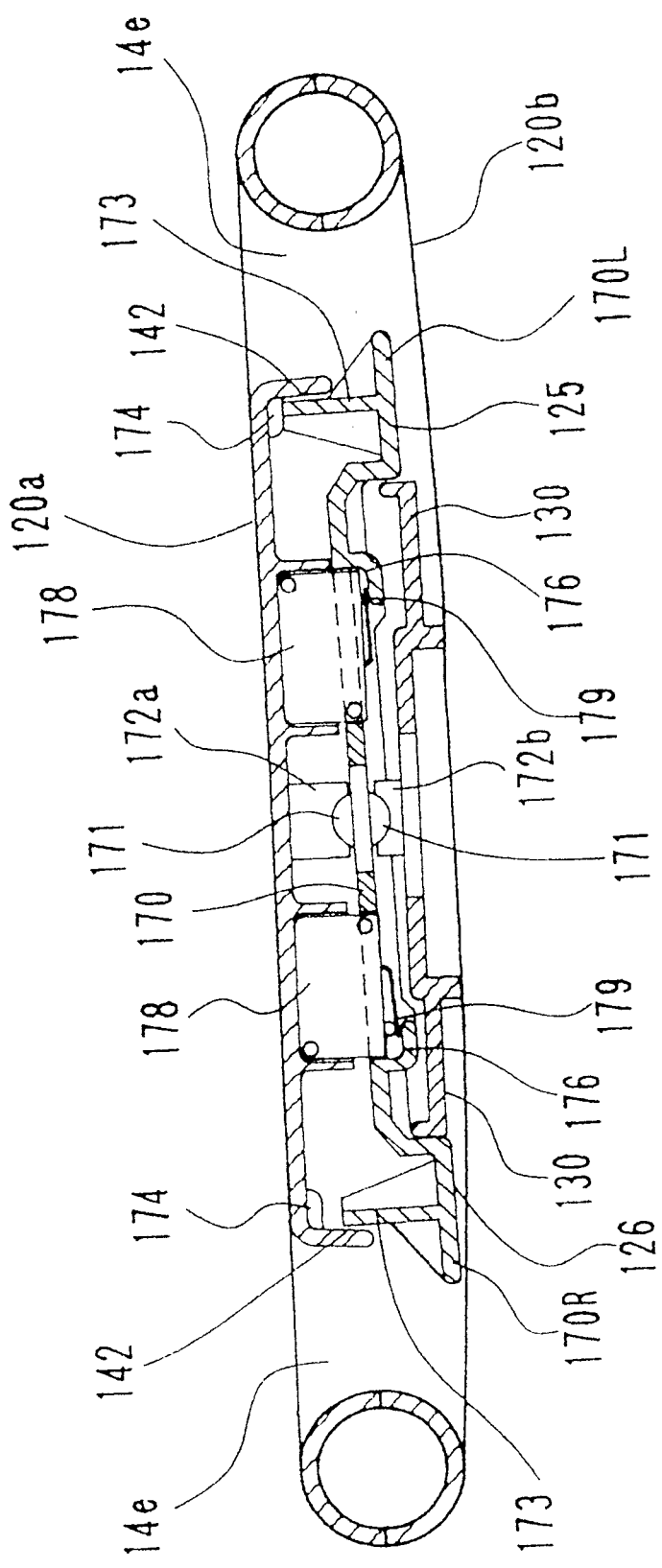
FIG. 24 is a cross sectional view of the steering wheel in FIG. 23.

FIG. 23 is a bottom view of a steering wheel 14 with a lower casing 120b removed. FIG. 24 is a cross sectional view taken along the line A—A showing the state when the lower casing 120b is attached. The right and left shift levers 125 and 126 are integrally formed as is denoted by reference number 170 as a right and left operation member in this embodiment. In other words, the portion that extends from a right operating portion 170R to a left operating portion 170L is integrally formed. For the shift lever 170, a rotary shaft 171 that is provided in the center is fixed between a shaft support portion 172a, which is provided on an upper casing 120a, and a shaft support portion 172b, which is provided on the lower casing 120b. The operating portions 170R and 170L of the shift lever 170 are respectively projected into the right and the left openings 14e through gaps between an internal wall 142 of the upper casing 120a and a bottom wall 130 of the lower casing 120b.

Further, upright stoppers 173 that are formed on the shift lever 170 are located opposite stoppers 174 on the upper casing 120a. In FIG. 24, the left operating portion 170L has been pulled up, while the right operating portion 170R has been accordingly lowered because they are integrally formed.

Right and left limit switches 178 are provided on the upper casing 120a. Windows 175 for switches are so provided in the shift lever 170 that they match the positions of the limit switches 178. In addition, switch manipulation portions 176 are so provided in the shift lever 170 that they match the positions of switch operating pieces 179 of the limit switches 178. As is apparent from FIGS. 23 and 24, the limit switches 178 are inserted into the switch windows 175. The switch manipulation portion 176 of one of the operating portions 170R and 170L that is pulled up presses the operating piece 179 of the corresponding limit switch 178, so that the switch is turned on.

With the integrally formed structure, right and left shift levers can be prevented, to a degree, from being pulled up at the same time.

As is described above, the shift levers can be located at the reverse of a steering wheel for the television game machine for home use. A player can perform a shift change without removing his hands from the steering wheel, and can experience a feeling that is similar to the sensation that is encountered during actual operation of a racecar.

Since, as is described above, the steering wheel control apparatus has a compact structure with which the operation of the right and left shift levers is performed independently, the apparatus is optimal for a home television game machine, and has a good appearance because of the simplified periphery of the steering wheel.

Since the points at which operation of the shift levers 125 and 126 is possible are the edges of the horizontal distal end portions 126e, the shift lever can be actuated by touching it with one of the fingers other than a thumb. A player therefore can easily operate the shift levers and avoid operation errors.

As the right and left shift levers 125 and 126 are independently operated, even though they are usually not actuated at the same time, there is a chance that the shift levers 125 and 126 can through error be operated erroneously at the same time. In such a case, a shift up signal and a shift down signal are generated at the same time, and therefore specific processing is required. In the modification shown in FIGS. 23 and 24, the integrally formed shift lever will be elastically deformed if a player pushes up on both sides of the shift lever with a stronger than usual pressure, and the operation for the right and left shift lever portions will be initiated at the same time and instruction signals for both operations will be generated.

The steering wheel control apparatus 3 in this embodiment has an electric processor that is employed when both the right and the left shift levers 125 and 126 are in the operational state.

Figure 8:
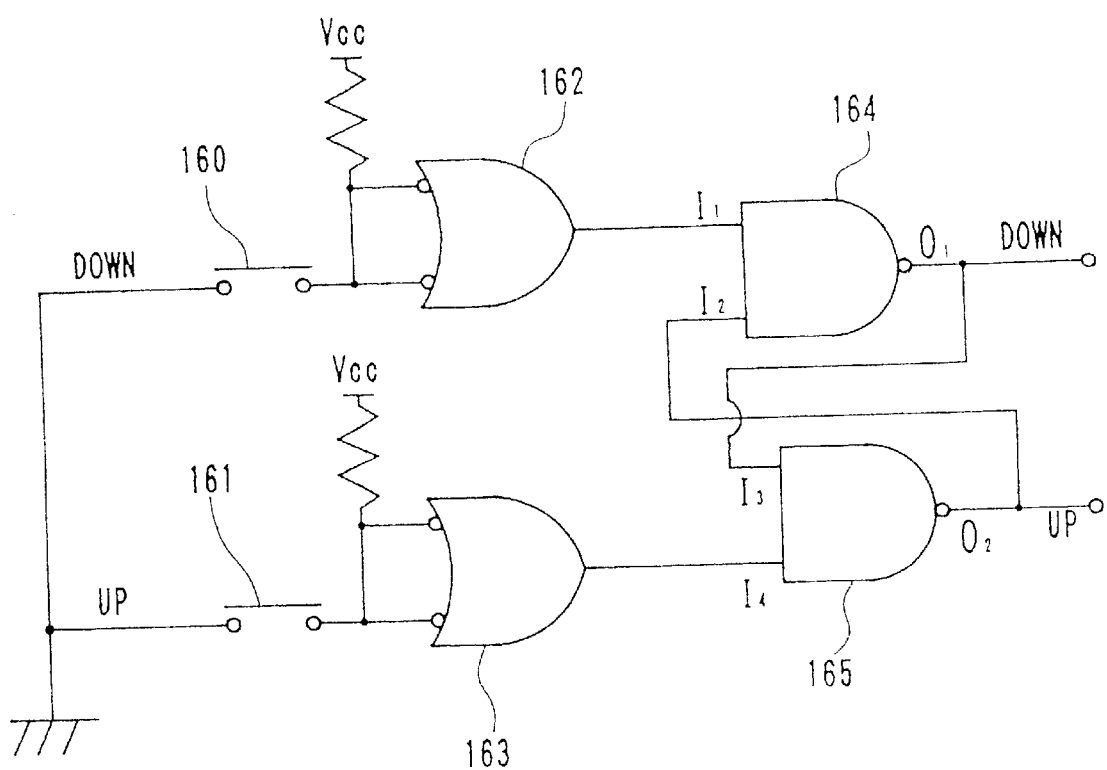
FIG. 8 is a diagram illustrating a simultaneous driving processor for the gearshift levers in FIG. 6.

The processor is shown in FIG. 8.

A shift down switch 160 for the left shift lever 125 and a shift up switch 161 for the right shift lever 126 are connected to the ground terminal at one ends and are connected to input terminals of respective OR gate type NAND gates 162 and 163 at another ends with being pulled up to voltage $V_{cc}$.

The output terminals of the NAND gates 162 and 163 are respectively connected to one input terminals $I_1$ and $I_4$ of AND gate type NAND gates 164 and 165. Output terminals $O_1$ and $O_2$ of the NAND gates 164 and 165 are connected to another input terminals $I_3$ and $I_2$ of the NAND gates 165 and 164.

A signal indicating a shift down is output from the output terminal $O_1$ of the NAND gate 164, and a signal indicating a shift up is output from the output terminal $O_2$ of the NAND gate 165.

With a high voltage level as 1 and a low voltage level as 0, when both switches 160 and 161 are off, the input terminals $I_1$ and $I_4$ of the NAND gates 164 and 165 are at 0 and the output terminals $O_1$ and $O_2$ are at 1 (it should be noted that when the output is a 0 an instruction signal is generated).

If one of the switches, for example, the shift down switch 160 is turned on first, the voltage level at the input terminal $I_1$ of the NAND gate 164 is changed to 1, and the voltage level at the other input terminal $I_2$ is 1. Thus, the voltage level at the output terminal $O_1$ becomes 0 and a shift down instruction signal is output.

At this time, the input terminal $I_3$ of the NAND gate 165 has a voltage level of 0. Even if the shift up switch 161 is turned on later so that both switches are in the ON state at the same time and the voltage level at the input terminal $I_4$ becomes 1, the output terminal $O_2$ remains at 1, and a shift up instruction is not issued.

Therefore, priority is given to the switch that is turned on first and that switch is regarded as the valid one, while the switch that is turned on later is invalid.

As is described above, when the switches are placed in the operating state at the same time, and when the shift down switch 160 is turned off first, the voltage at the input terminal $I_1$ of the NAND gate 164 is set to 0. Accordingly, the voltage level at the output terminal $O_1$ becomes 1 and the instruction for a shift down is not generated. At the same time, the voltage level at the input terminal $I_3$ of the NAND gate 165 becomes 1 and the voltage level at the input terminal $I_4$ is 1. The voltage level of the output terminal $O_2$ is changed to 0 and an instruction signal for a shift up is output.

When the switches are placed in the ON state at the same time, the switch that is turned off first is regarded as the invalid one and the switch that is maintained on is regarded valid. Such processing substantially matches the intent of a player.

Thus, even if a player erroneously operates the right and left shift levers 125 and 126 at the same time, the operation progresses automatically in consonance with the intent of the player, and excellent usability is provided.

Fixed structure of the base casing of the steering wheel control apparatus

FIGS. 2 through 4 will be referred to again for the explanation of the fixed structure of the base casing 10 of the steering wheel control apparatus in this embodiment.

Figure 9:
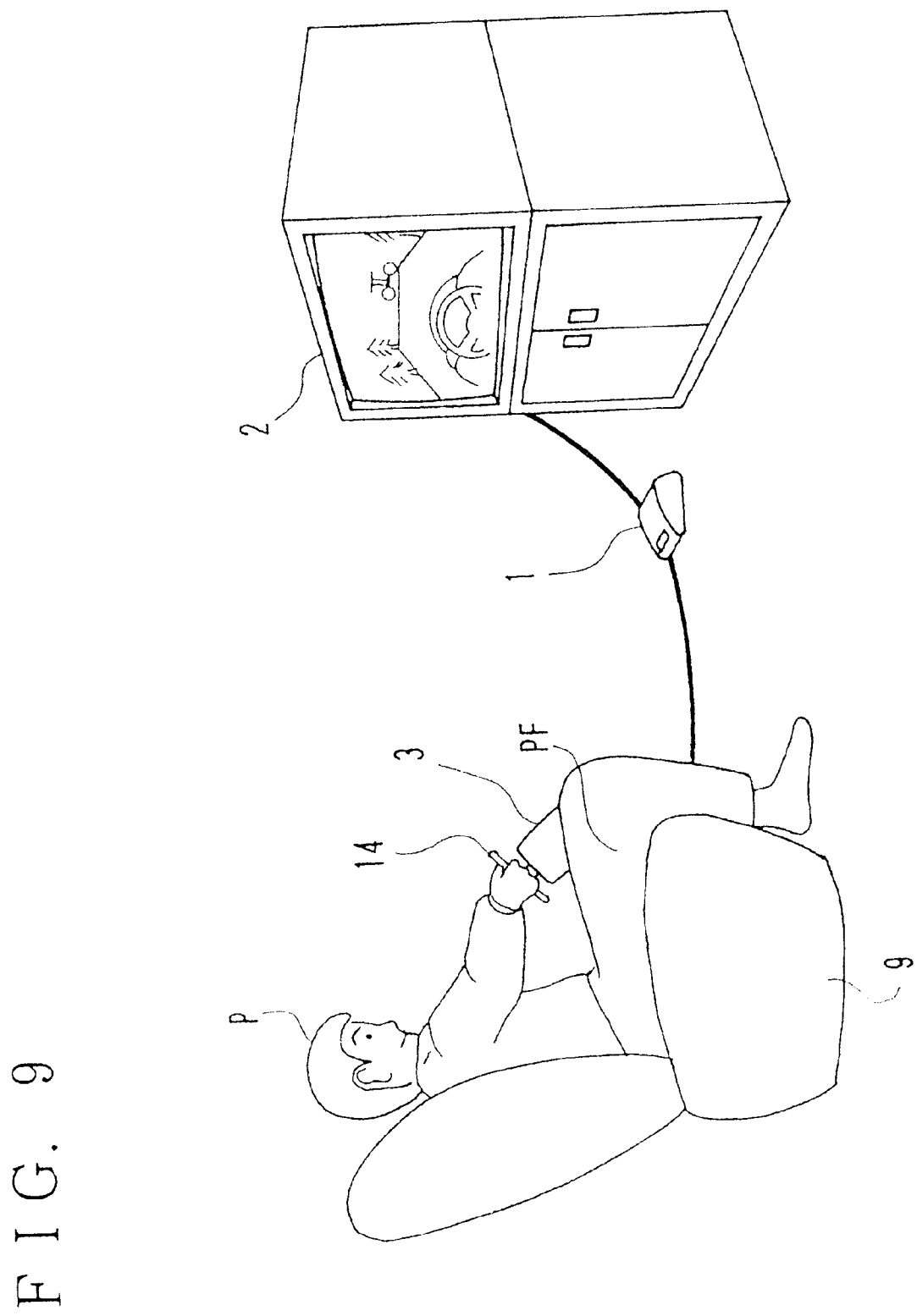
FIG. 9 is a sketch showing the steering wheel control apparatus according to the embodiment of the present invention while it is in use.

The front wall 10a, the top wall 10b, the side walls 10c and the plate 10d constitute the structure as shown. To use the steering wheel control apparatus 3, as is shown in FIG. 9, the steering wheel control apparatus 3 is placed, with the steering wheel 14 held by the hands, between thighs PF of a player P who is seated on the sofa 9. The thighs contact the side walls 10c of the base casing 10 to hold the base casing 10, and at the same time, the thighs are mounted on the horizontally extending plate 10d to hold it between the thighs and the sofa 9, so that the steering wheel control apparatus is securely held in place.

Since both front ends 10dc of the plate 10d are diagonally cut back (see the broken line in FIG. 3), the back of the knees of the player P does not touch the plate 10d and the player feels comfortable while using it. Further, as the surface of the plate 10d is processed by creping to prevent it from sliding, the steering wheel control apparatus 3 is securely held in place by the pressure of the thighs.

The side walls 10c of the base casing 10 that is held between the thighs are so provided that their interval is reduced toward the rear. That is, the side walls 10c are so provided that they form a shape that is similar to an opened fan from the juncture of the legs outward toward the knees, so that it is easy to hold the steering wheel control apparatus 3 between the thighs while using it. As is described, the steering wheel control apparatus 3 is securely fixed by the thighs PF of the player P. The player P does not, therefore, have to worry about the base casing 10 shifting during the operation of the steering wheel, and can thus concentrate on playing and can fully enjoy the game.

In this embodiment, the creping is performed on the surface of the plate 10d. The formation of protrusions, and dimple processing or knurling, which are effective for the prevention of sliding, may be performed, or a coating of rubber to prevent sliding may be applied.

If rubber feet or sucking disks are attached to the bottom plate 11 on the lower face of the plate 10d, the rubber feet or the sucking disks will perform effectively with some types of chairs in which the player P sits, and the steering wheel control apparatus 3 can be held more securely.

The steering wheel control apparatus 3 of this embodiment is so designed that a plurality of the button switches 15, and the shift levers 125 and 126 are provided on the steering wheel 14 so that the player P can control the game while P holding the steering wheel 14. If the base casing 10 is adequately secured by the thighs of the player P, as is described above, the usability of the apparatus can be enhanced.

Steering wheel position adjustment mechanism

The steering wheel control apparatus 3 of this embodiment permits the position of the steering wheel 14 to be changed and adjusted to a position that is appropriate for a player. The adjustment mechanism will now be explained while referring again to FIGS. 2, 3 and 4, and to FIGS. 10 through 15.

First, the position adjustment mechanism for the inclination angle of the steering column 12 will be explained.

Figure 10:
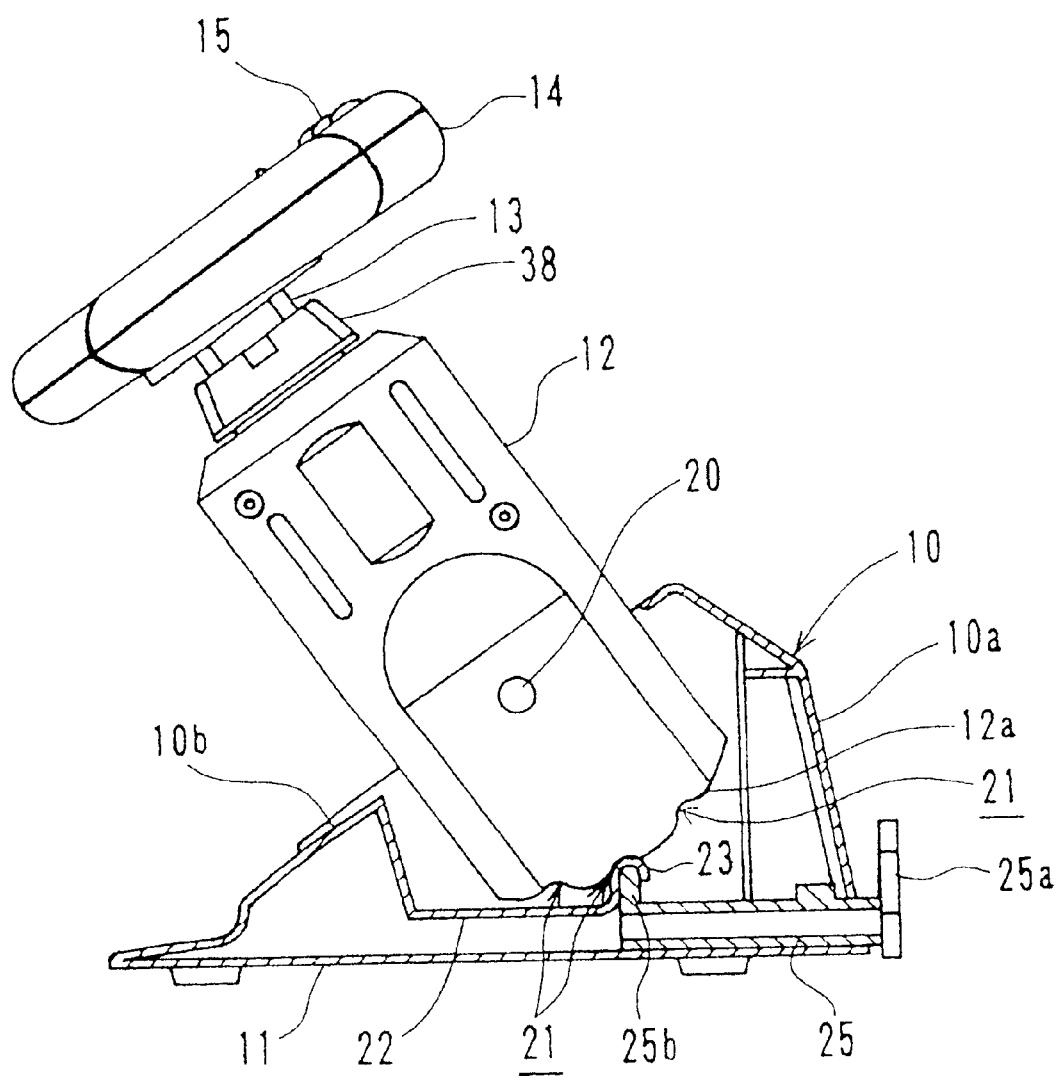
FIG. 10 is a side view of the steering wheel control apparatus with the base casing in its cross section, showing the inclination locked state of the embodiment of the present invention.
Figure 11:
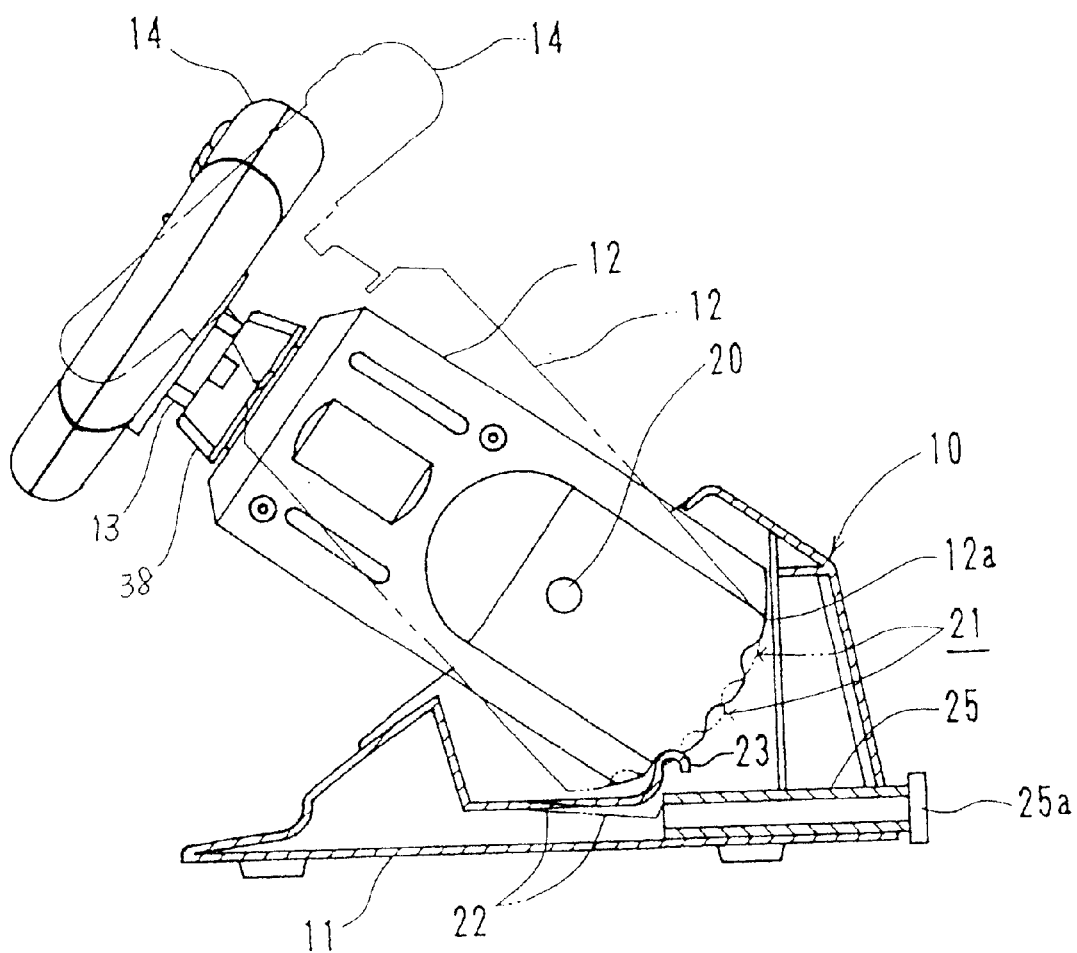
FIG. 11 is a side view of the steering wheel control apparatus in FIG. 10 when it is temporarily held.
Figure 12:
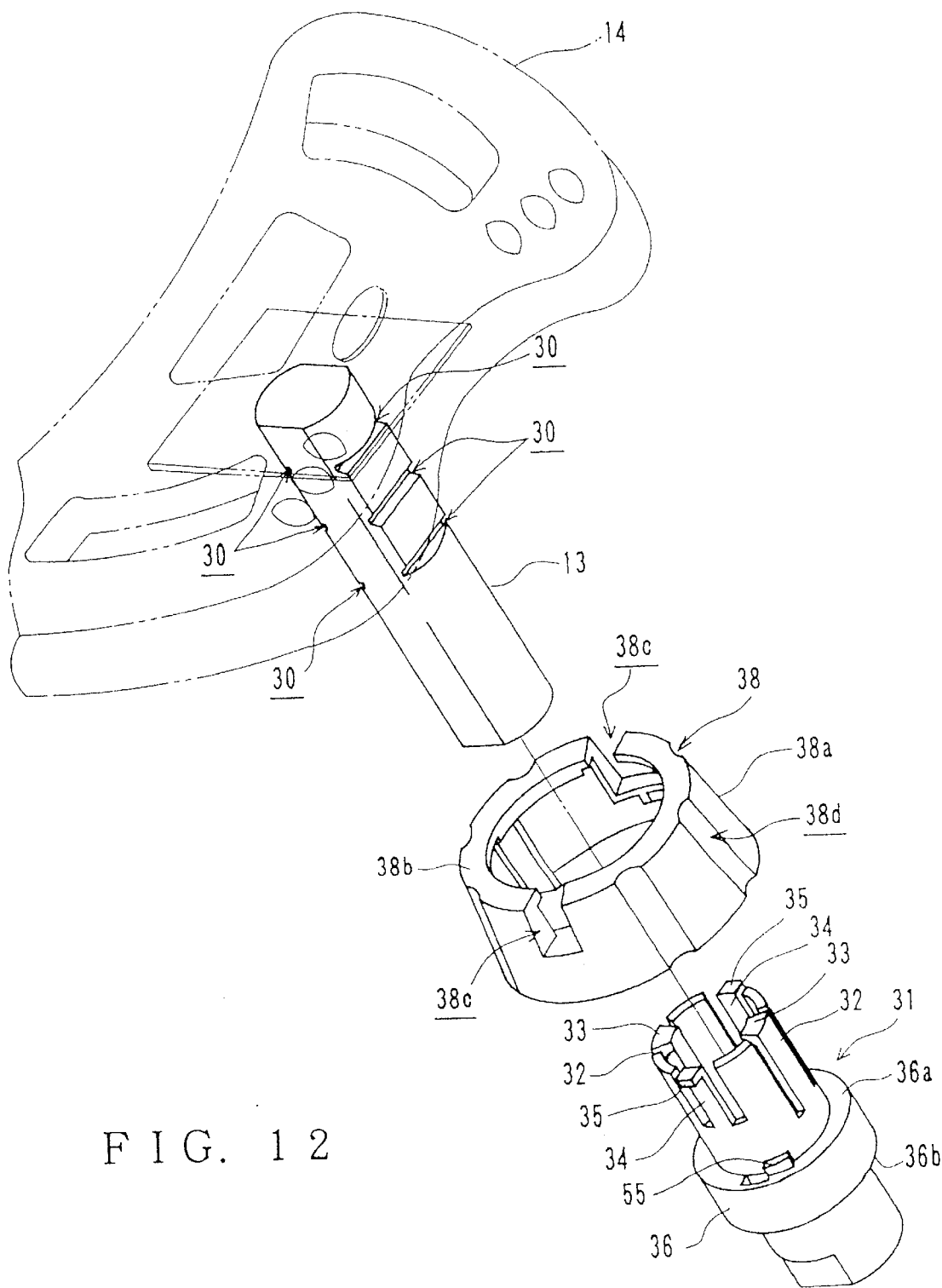
FIG. 12 is an exploded perspective view of a steering shaft, an extension/depression locking member, and an engagement cylinder member that constitute an extension/depression adjustment mechanism according to the embodiment of the present invention.

As is shown in FIGS. 10 and 11, between the side walls 10c of the base casing 10, the slightly lower end center portion of the steering column 12 is pierced by a shaft 20 that passes through it horizontally and supports the steering column 12 and permits it to incline freely.

A bottom wall 12a of the cylindrical steering column 12 serves as a part of a cylindrical wall that employs the shaft 20 as a center axis. Three grooves 21, which are extended horizontally, are formed at equal intervals along the external circumference of the cylinder. In the embodiment, the boundary portions at the grooves 21 are formed smoothly and thus the external circumference of the bottom wall 12a has a wave shape.

In the opening, of the top wall 10b of the base casing 10, into which the steering column 12 is fitted, a flat engagement member 22 that has a predetermined width extends from the lower edge of the opening. As is shown in FIGS. 10 and 11, the engagement member 22, which is extended downward from the opening edge, is bent forward and extends horizontally, and its distal end is curved upward to form an engagement protrusion 23.

The engagement member 22 that has a long length from the front to the rear is flexible, and the engagement protrusion 23 at the distal end can be displaced downward by elastic deformation. The engagement protrusion 23 of the engagement member 22 is fitted into one of the grooves 21 in the bottom wall 12a of the steering column 12 to temporarily hold the steering column 12 at a current inclined position.

A cylindrical inclination locking member 25 is inserted along the top face of the bottom wall 11 through a round hole, which is located in the lower end center of the front wall 10a of the base casing 10, and is rotatably supported while it is directed to the front and to the rear.

A knob 25a is formed at the portion, of the inclination locking member 25, that extends forward from the front wall 10a of the base casing 10. An operating portion 25b that projects to the side is formed at the distal end of the member 25 that is inserted into the base casing 10. The operating portion 25b can engage the recess that is defined by the lower face of the engagement protrusion 23 of the engagement member 22, which is curved upward.

In FIG. 10 is shown the locking state for the inclination locking member 25. In this condition, the engagement protrusion 23 of the engagement member 22 is fitted into the center groove 21 in the bottom wall 12a of the steering column 12, and the operating portion 25b of the inclination locking member 25 engages the recess that is formed at the distal end of the engagement protrusion 23. The downward displacement of the engagement protrusion 23 is inhibited by the operating portion 25b that engages it. Even if a player desires to change the inclination of the steering column 12, the engagement protrusion 23 can not be removed from the groove 21 in the bottom wall 12a of the steering column 12 by which the steering column 12 is held in the inclined position, and the inclination of the steering column 12 can not be changed.

When the knob 25a of the inclination locking member 25 is rotated about 90 degrees, the inclination locking member 25 rotates the same distance. As is shown in FIG. 11, the operating portion 25b is thereby disengaged from the engagement protrusion 23 and the engagement member 22 is therefore susceptible to elastic deformation, enabling the engagement protrusion 23 to be displaced downward.

At this time, the steering column 12 is temporarily held by the engagement protrusion 23. As is shown in FIG. 11, if the steering column 12 is inclined further, the engagement protrusion 23, which is fitted into the groove 21 by the elastic deformation of the engagement member 22, is thereby disengaged from that groove 21, travels along the circumference of the cylinder, and engages the next groove 21. The inclination angle of the steering column 12 is thus changed and the steering column 12 is temporarily held in position (see the chain double-dashed lines in FIG. 11).

Such a state is shown in FIG. 11. When the steering column 12 is held temporarily, the steering column 12 can be inclined and its inclination angle can be changed and set at three different angles by engaging the three individual grooves 21 with the engagement protrusion 23. In other words, the inclination angle of the steering wheel 14 can be adjusted and set at three separate angles.

When the inclination locking member 25 is rotated and the operating portion 25b engages the engagement protrusion 23 to lock the steering column 12, the inclination angle of the steering wheel 14 is fixed.

The adjustment of the positioning distance for the steering wheel 14, i.e., the extension and depression structure of the steering shaft 13, will now be described while referring to FIGS. 12 through 15.

The steering shaft 13, to which the steering wheel 14 is integrally fixed at its top end, is formed in a substantially parallelepiped shape, and three grooves 30 that extend perpendicular to the axial direction are formed, in a row along the shaft, in side faces that are opposite to each other. The steering shaft 13 is fitted into an engagement cylinder 31.

The engagement cylinder 31 is hollow, and the opening in its lower half has a substantially parallelepiped shape that is the same as the cross section of the steering shaft 13. The steering shaft 13 is fitted into and slides in the axial direction within that lower half and the two rotate together.

The upper half of the engagement cylinder 31 is cylindrical, and in it two pairs of engagement pieces 32 and 34, in which each piece faces a like piece, are formed by the provision of a plurality of slits in the axial direction.

The engagement pieces 32 each have an engagement pawl 33 that protrudes inward, and the other engagement pieces 34 each have an engagement pawl 35 that projects outward.

An annular member 36 is fitted around the external surface of the engagement cylinder 31 at a location that is slightly lower than the center.

A ring shaped extension/depression locking member 38 is rotatably fitted over the top end of the engagement cylinder 31, and the steering shaft 13 is passed through the extension/depression locking member 38.

The extension/depression locking member 38 consists of a tapered external wall 38a and a circular portion 38b, with the diameter at its top edge being the smallest. Slits 38c are formed on opposite sides in the tapered external wall 38a, and a plurality of grooves 38d are formed in the external surface. The configuration of the interior of the extension/depression locking member 38 is apparent from the description in FIG. 15 that illustrates its structure from below. More specifically, four operating portions 39, each of which projects inward toward another from the internal surface of the wall 38a, are arranged parallel to the center axis. Further, engagement portions 40 that are perpendicular to the center axis are provided via walls 40a that extend downward from the circular portion 38b (that extend upward in the diagram). While the wall 40a is provided at one end of each engagement portion 40, a stopper wall 40b is provided at the other end of the engagement portion 40 in parallel to the operating portion 39. With this arrangement, the circular portion 38b, the walls 40a, the engagement portions 40 and the stopper walls 40b define spaces, and the engagement pawls 35 can be rotated, which will be described later.

The distance between the opposing operating portions 39 and the distance between the engagement portions 40 are slightly greater than the outer diameter of the engagement cylinder 31. The inner diameter of the circular portion 38a is smaller than the outer diameter of the engagement cylinder 31 and greater than the outer diameter of the steering shaft 13.

In the extension/depression locking member 38 that covers the top end of the engagement cylinder 31, the engagement pieces 32 and 34 that are arranged in a circle around the engagement cylinder 31 are fitted into the corresponding operating portions 39 and the engagement portions 40. By displacing the engagement piece 34 inward, each engagement pawl 35 whose distal end faces outward is engaged in the portion that is defined by the engagement portion 40. The engagement pawls 35 can move within this space in the direction indicated by the arrow B in FIG. 15, and as a result, the extension/depression locking member 38 can be rotatably attached to the engagement cylinder 31.

When the steering shaft 13 is inserted, the engagement pieces 32 of the engagement cylinder 31 are elastically displaced outward by the engagement pawls 33 that extend inward. When the engagement pawls 33 reach opposing grooves 30, together they engage the grooves 30 and the engagement pieces 32 return to their original positions relative to the cylinder.

Figure 13:
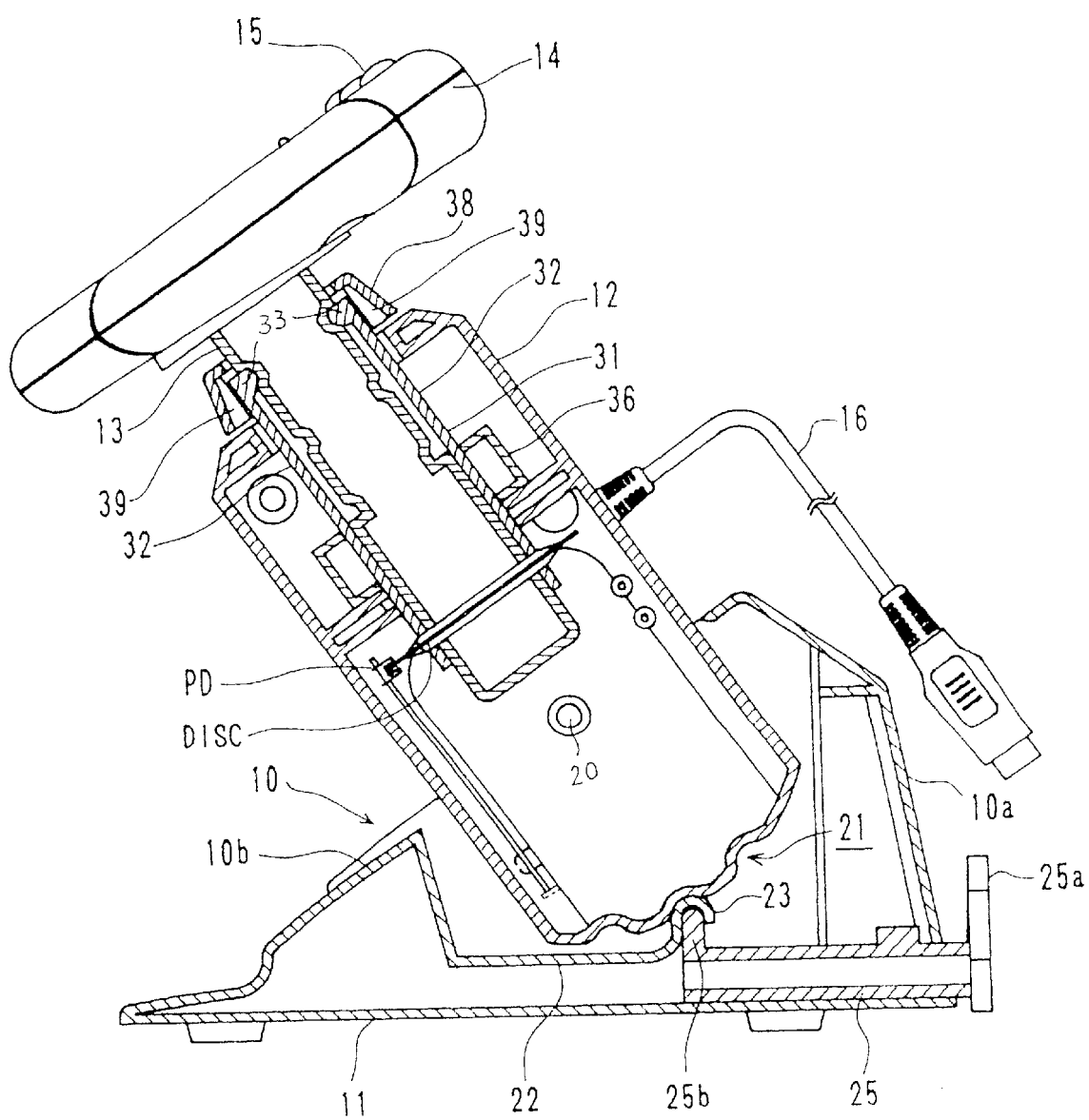
FIG. 13 is a cross sectional view of the steering wheel control apparatus when the extension/depression portion adjustment structure is locked by the mechanism in FIG. 12.
Figure 14:
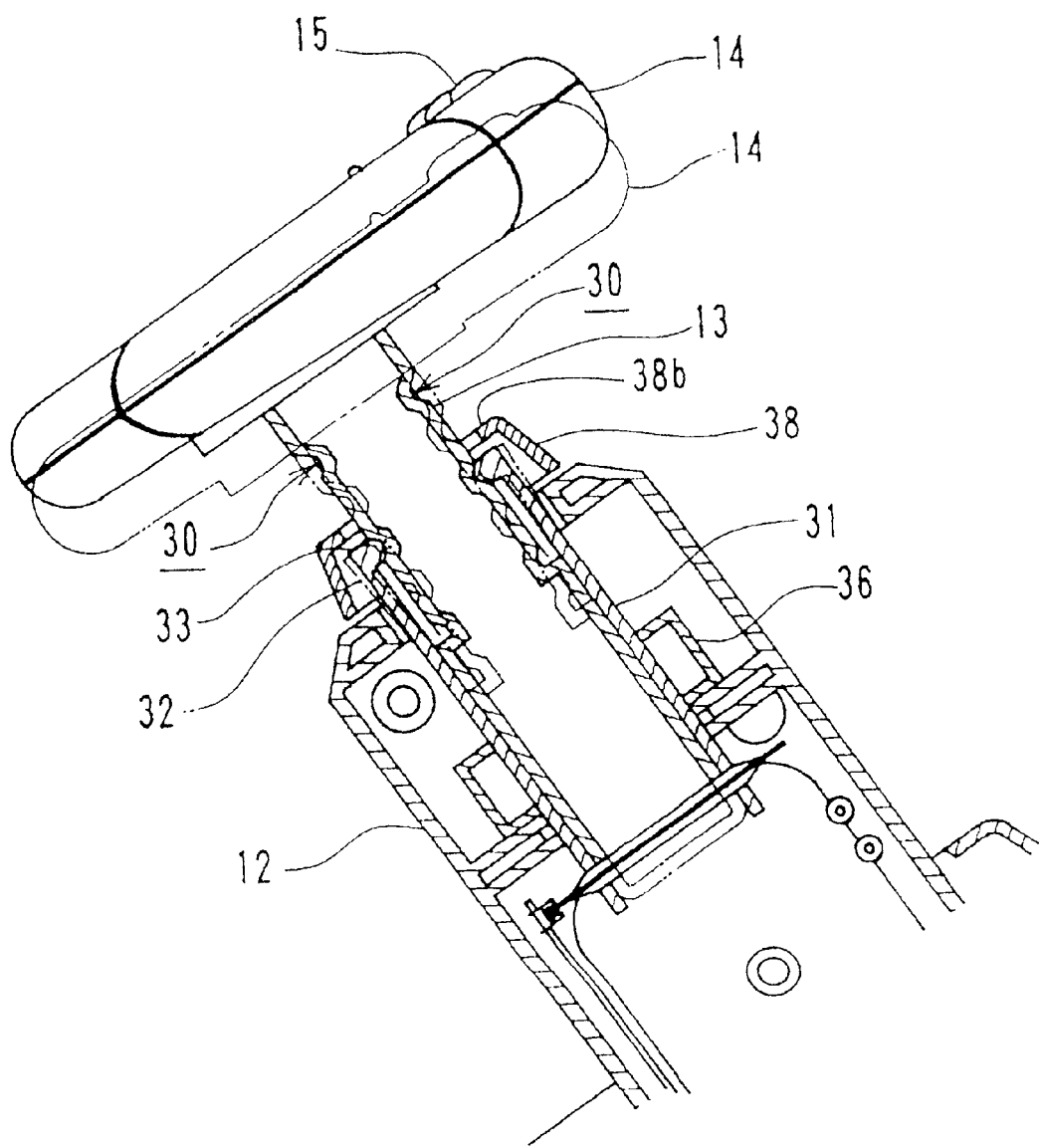
FIG. 14 is a cross sectional view of the steering wheel control apparatus when the extension/depression portion adjustment structure is temporarily held by the mechanism in FIG. 12.

In this manner, the steering shaft 13 is inserted into the engagement cylinder 31, and the extension/depression locking member 38 is fitted over the top end of the engagement cylinder 31. This state is shown in FIGS. 13 and 14. As is shown in FIG. 15, the operating portions 39 of the extension/depression locking member 38 are set in the locked state (the state as indicated by the chain double-dashed lines) when the operating portions 39 are positioned at the distal ends of the engagement pieces 32 (indicated by the chain double-dashed lines), and in the released state when the operating portions 39 are removed from the distal ends of the engagement pieces 32 by the rotation of the extension/depression locking member 38 in the direction indicated by the arrow A in FIG. 15.

In FIG. 13 is shown the locked state. The engagement pawls 33 at the distal ends of the engagement pieces 32 of the engagement cylinder 31 are fitted into the grooves 30 in the steering shaft 13, and the operating portions 39 are positioned at the edge of the engagement pieces 32, which inhibits the disengagement of the engagement pawls 33 from the grooves 30 with the engagement pieces 32 opening outward. The steering shaft 13, therefore, can not be extended or depressed, and the operating distance for the steering wheel 14 (the height position of the steering wheel 14) is fixed.

Figure 15:
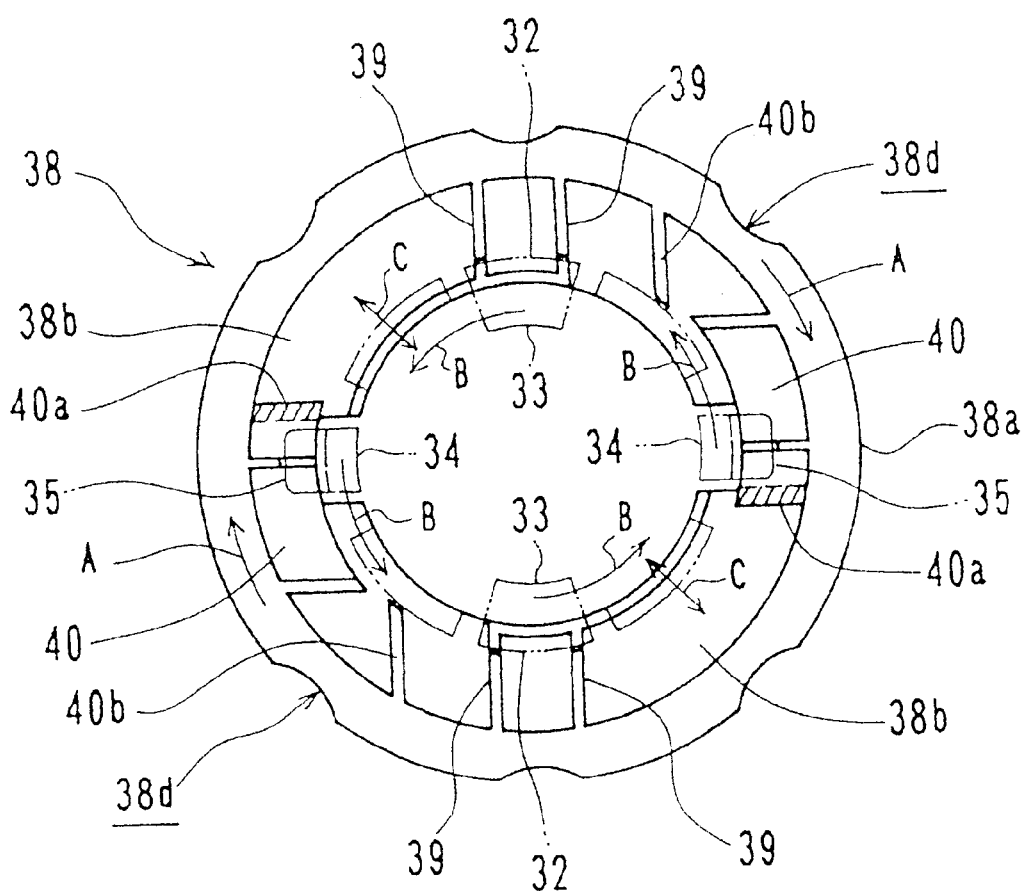
FIG. 15 is a bottom view of an extension/depression locking member 38 in FIG. 12.

In this condition, when the extension/depression locking member 38 rotates in the direction indicated by the arrow A in FIG. 15 to set the released state, the engagement pieces 32 are shifted in the direction indicated by the arrow B, and they can be spread outward, as is indicated by the double-headed arrow C. Then, the steering shaft 13 is extended or depressed by holding the steering wheel 14 and pulling or pushing it. The engagement pieces 32 are elastically deformed, and the engagement pawls 33 are removed from the grooves 30. Then, as is shown by the chain double-dashed lines in FIG. 14, the engagement pawls 33 slide over the side faces between the grooves 30 and engage other grooves 30, so that the steering shaft 13 is temporarily held in place. The solid lines in FIG. 14 indicate the temporary holding state.

In this state, the position of the steering wheel 14 can be freely changed. In this embodiment, three sets of opposed grooves 30 are formed in the steering shaft 13 to enable it to be moved forward and backward and positioned the three different levels.

When the steering shaft 13 is temporarily held at a proper position, the extension/depression locking member 38 is rotated in the direction opposite to the arrow A so as to provide the locked state with the operating portions 39 positioned at the distal ends of the engagement pieces 32. Since the engagement pawls 35 are sandwiched between the walls 40a and the stopper walls 40b, movement in the direction that is indicated by the arrow B and the range is limited, as is described above.

The position of the steering wheel 14 can be adjusted and fixed in the above described manner.

Centering mechanism

The steering wheel control apparatus 3 in this embodiment has a centering mechanism by which, when a steering wheel is released, it is automatically returned to a center portion for straight forward driving. The centering mechanism will now be described while referring to FIGS. 16 through 18.

Figure 16:
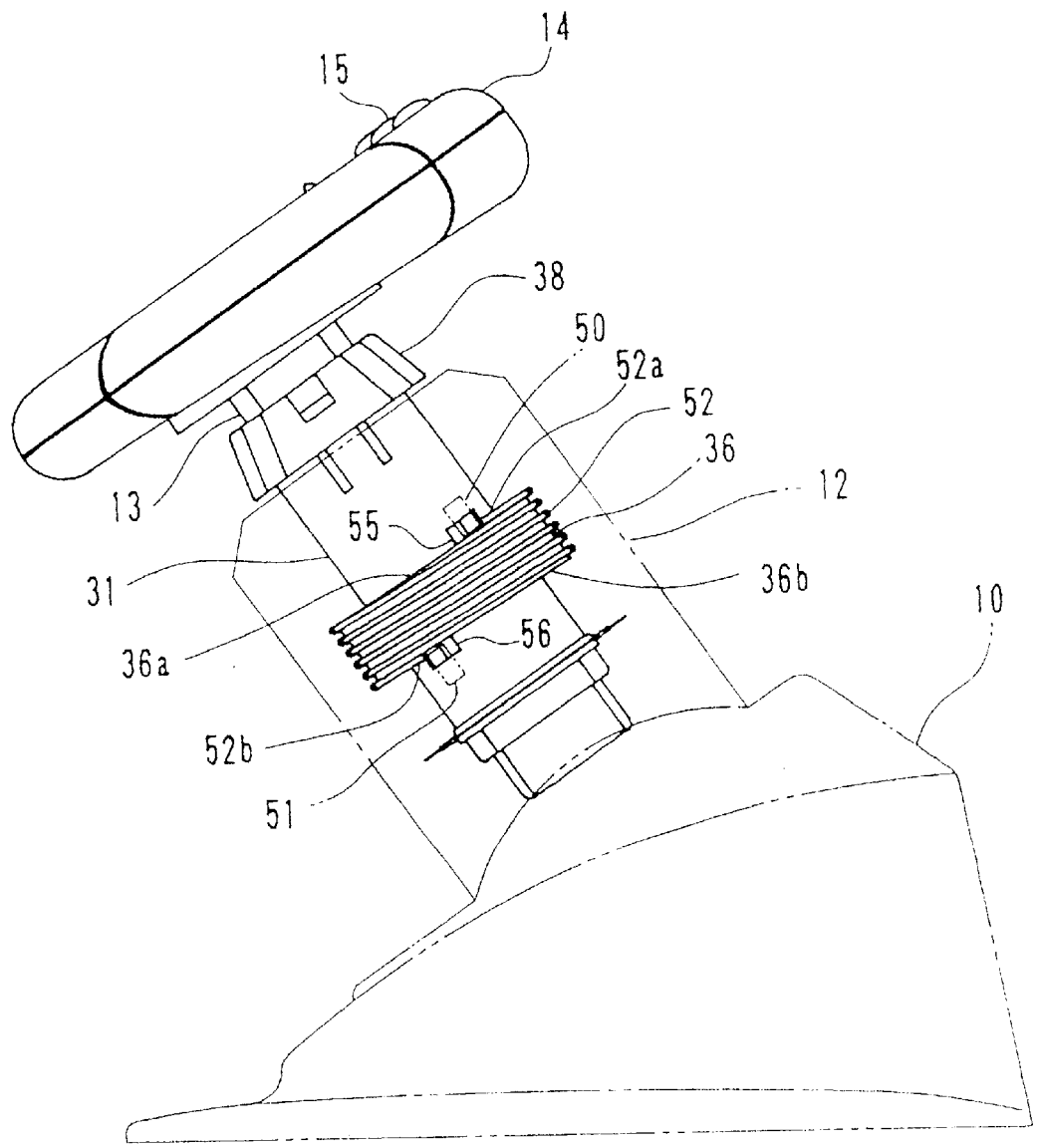
FIG. 16 is a partially cutaway side view of a centering mechanism of the steering wheel control apparatus according to the embodiment of the present invention.
Figure 17:
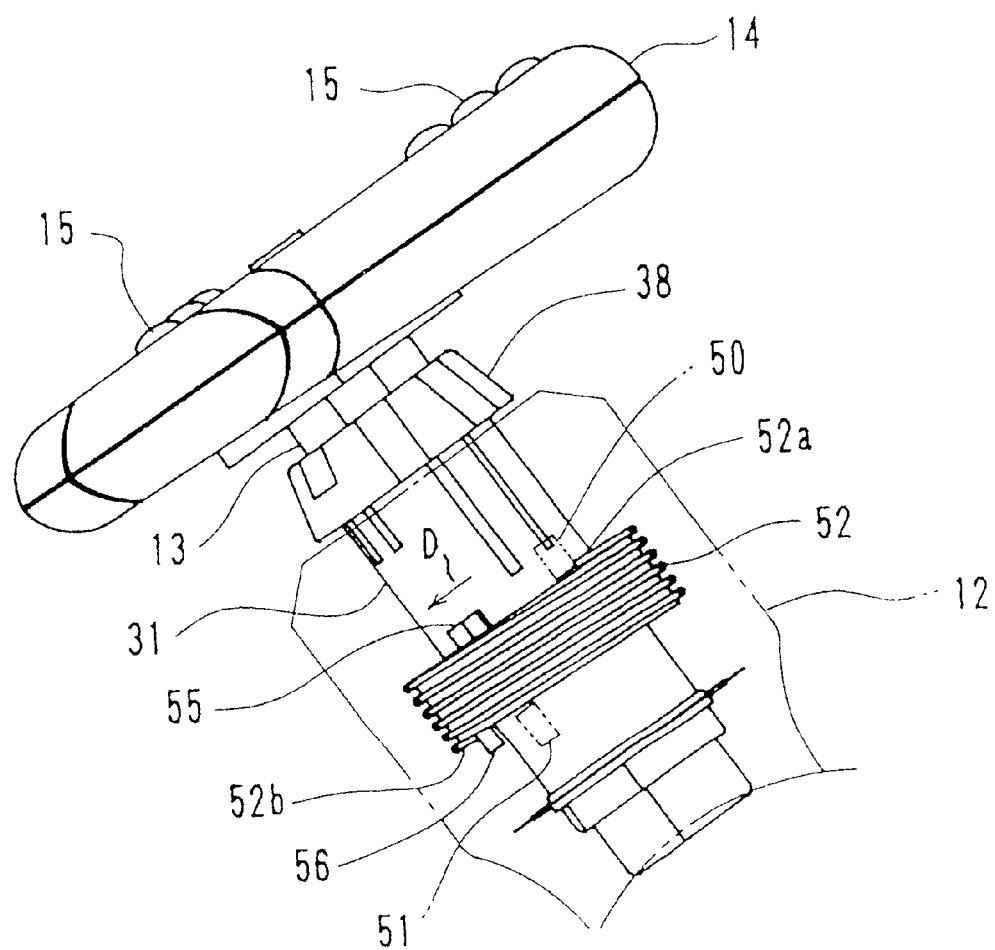
FIG. 17 is a side view of the centering mechanism when the steering wheel is rotated to the right.
Figure 18:
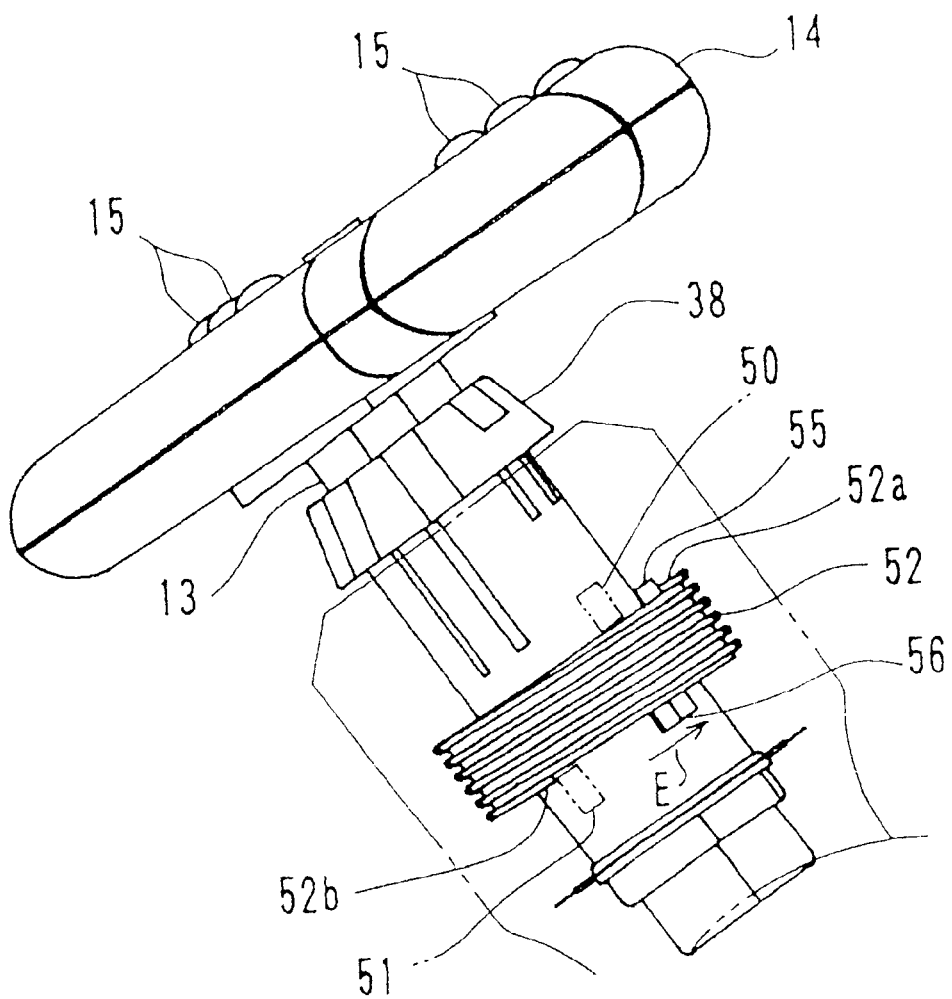
FIG. 18 is a side view of the centering mechanism when the steering wheel is rotated to the left.

The steering column 12 is indicated by the chain double-dashed lines in FIGS. 16 through 18, and stoppers 50 and 51 project inward at given positions inside the steering column 12. The stoppers 50 and 51 are located at positions along the upper and lower faces 36a and 36b of the annular member 36, which is fitted over the engagement cylinder 31 that rotates with the steering shaft 13.

Protrusions 55 and 56 are provided at predetermined positions on the upper and lower faces 36a and 36b of the annular member 36.

In FIG. 16 is shown a steering wheel 14 when it is in the center position for straight forwarding driving. The protrusions 55 and 56 of the engagement cylinder 31 are positioned side by side with the respective stoppers 50 and 51 of the steering column 12. A torsion spring 52 is so provided around the external surface of the annular member 36, with its top end 52a abutting upon the stopper 50 and the protrusion 55 and its bottom end 52b abutting upon the stopper 51 and the protrusion 56, that the torsion sprint 52 exerts a slight urging force in the closing direction.

As is shown in FIG. 17, therefore, when the steering wheel 14 is rotated clockwise, the engagement cylinder 31 is also rotated clockwise with the steering shaft 13 and the protrusions 55 and 56 are rotated clockwise as is indicated by the arrow D. The top end 52a of the torsion spring 52 is held stationarily by the stopper 50, and the bottom end 52b is driven by the protrusion 56. As a result, the torsion spring 52 is gradually opened, while a reaction force acts on the steering wheel 14 to return it to its original position.

When the steering wheel 14 is rotated counterclockwise, the protrusions 55 and 56 are turned in the direction indicated by the arrow E, as is shown in FIG. 18. The bottom end 52b of the torsion spring 52 is held stationary by the stopper 51, and the top end 52a is driven by the protrusion 55, so that the torsion spring 52 is gradually opened. A reaction force acts on the steering wheel 14 to return it to its original position.

The reaction force that acts on the steering wheel 14 increases in consonance with an increase in the steering angle.

When the player P rotates the steering wheel 14, he is aware of a reaction force that is consonant with the steering angle. When the player P releases the steering wheel 14, it is automatically returned to the center position for straight forwarding driving, thus imparting to the player P a sensation of actually driving a car.

The steering wheel control apparatus in this embodiment has the above described arrangement. The player P sits down on the seat 9 while holding the steering wheel control apparatus 3 between the thighs, and fixes the base casing 10. First, the knob 25a of the inclination locking member 25 is manipulated to release the steering wheel 14 from a fixed inclination and to temporarily hold it in position. The steering column 12 is inclined with the steering wheel 14 and is adjusted to the most appropriate inclination angle. Then, the inclination locking member 25 is manipulated again to the locked position to fix the inclination of the steering wheel 14. Following this, the extension/depression locking member 38 is rotated to release the steering wheel 14 from the position in which it is fixed and to temporarily hold it in position. The steering shaft 13 is extended or depressed with the steering wheel 14 to adjust the position (the height) of the steering wheel 14 so as to obtain the most appropriate position. The extension/depression locking member 38 is operated and locked, and the position of the steering wheel 14 is fixed.

As is described above, since the inclination and the position of the steering wheel 14 can be adjusted, the steering wheel 14 can be set at an optimal position for each player and can be controlled easily, and a player can always enjoy a game under the best conditions. Especially when a plurality of operational button switches 15 and the shift levers 125 and 126 are provided on the steering wheel 14, a steering wheel 14 can be fixed at an optimal position for a player, and its usability can be increased.

Since the centering mechanism is provided for the steering wheel, a player can experience a feeling that is similar to actually driving a car, and can thus enjoy the game more.

The steering control in this embodiment is performed by a control disk DISC, which is provided around the engagement cylinder 36, and a light transmitter/detector PD, which is provided adjacent to the disk DISC, as is shown in FIG. 13. A plurality of holes are formed intermittently around the circumference of the control disk DISC. Light that is emitted by the transmitter/detector PD on one side of the disk passes through these holes and is acquired on the other side to detect the rotational direction and the angle of the steering wheel.

Figure 19:
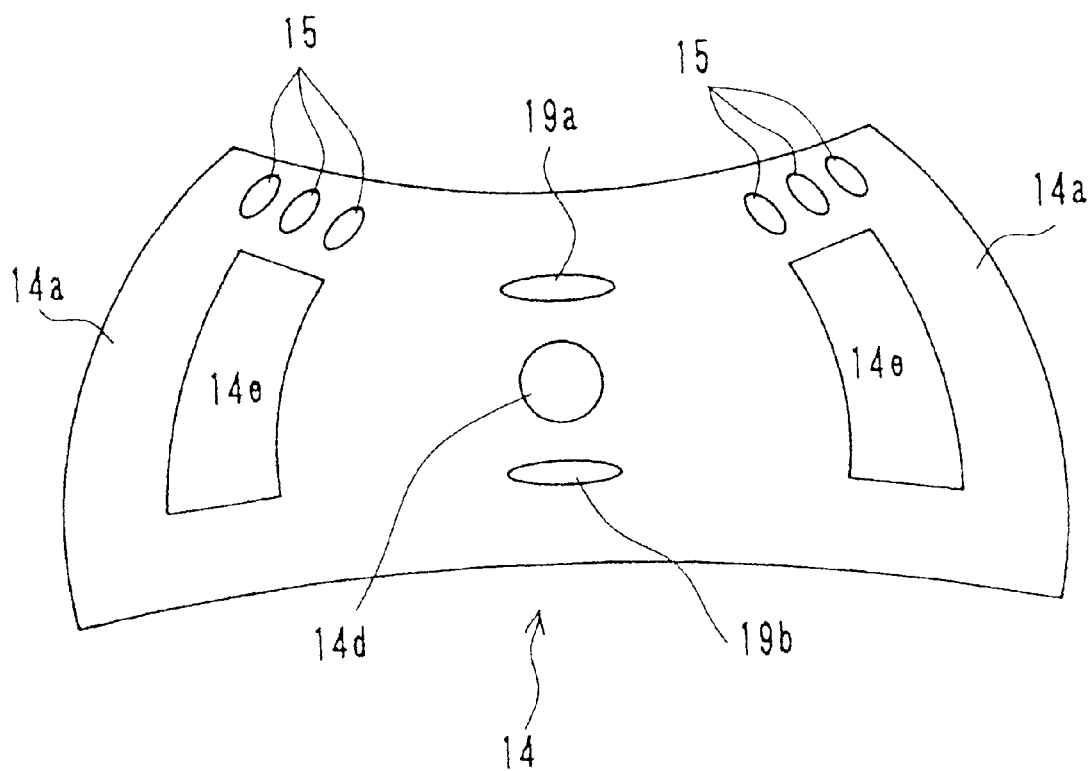
FIG. 19 is a top view of the steering wheel of the steering wheel control apparatus according to the embodiment of the present invention.

In FIG. 19 is shown another embodiment where button switches 19a and 19b are provided on the upper and lower sides of a center portion 14d of a steering wheel 14. A game start switch and a game stop switch are provided in the steering wheel center portion 14d and serve as button switches that are not used during the playing of the game.

Figure 20:
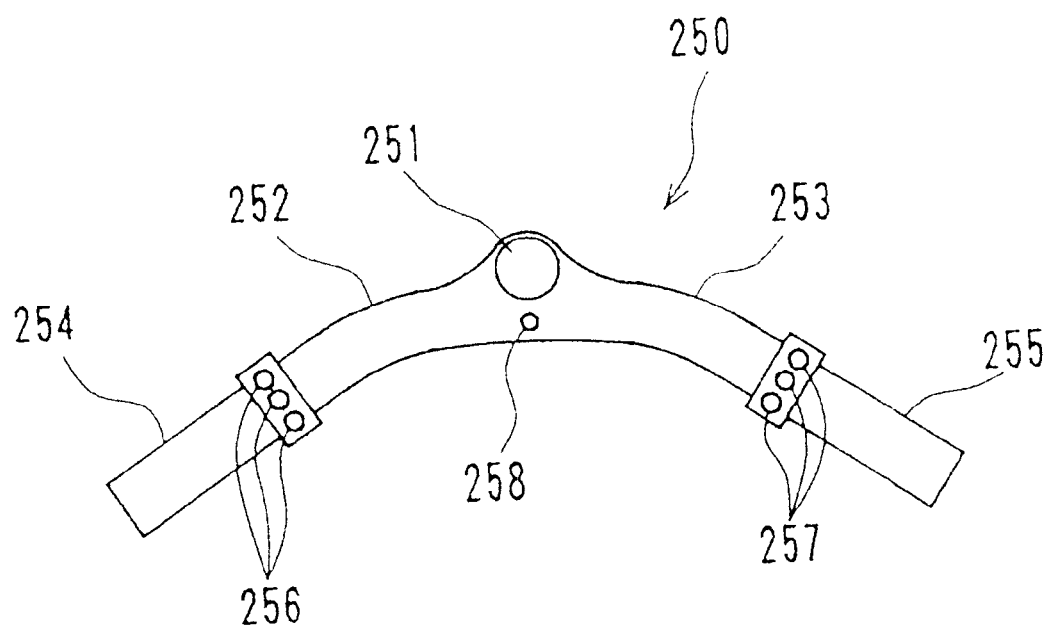
FIG. 20 is a top view of a handlebar control apparatus according to another embodiment of the present invention.
Figure 21:
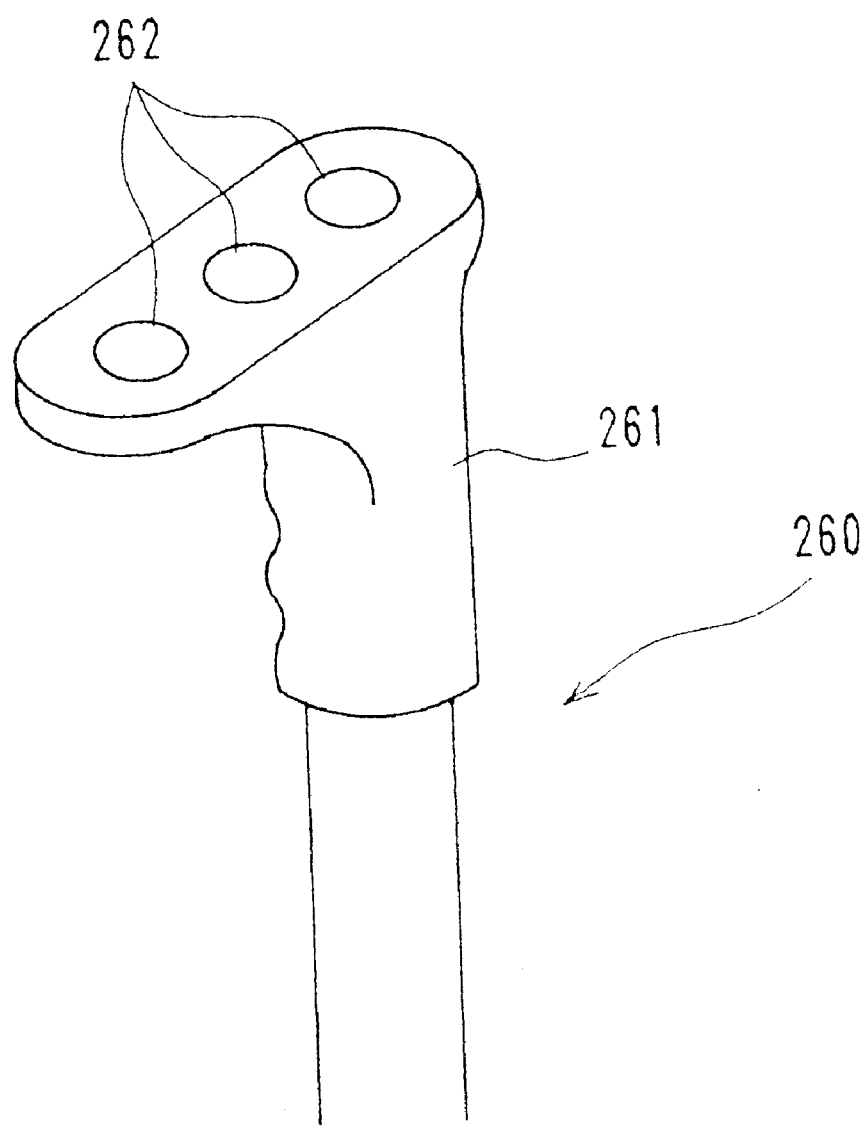
FIG. 21 is a perspective view of a control column control apparatus according to an additional embodiment of the present invention.

FIGS. 20 and 21 show an example where a plurality of button switches are provided on a handlebar that is employed for motorcycles, and an example where a plurality of button switches are provided on a control stick.

FIG. 20 is a top view of a handle bar 250. Handlebars 252 and 253 that extend to the left and to the right from a rotary shaft 251 have grips 254 and 255 at their distal ends. Push button sets 256 and 257, in each of which are three push buttons, are respectively located at the roots of the grips 254 and 255, toward the front of the handlebar. The push button switch sets 256 and 257 are in sight of a player, enabling the player to visually select a button and to depress the button with a thumb while holding the grips 254 and 255. Another push button switch 258 is also provided near the rotary shaft 251. These push button switches can function the same as those in the previous embodiment.

As is shown in FIG. 21, which shows a control stick 260, three push button switches 262 are arranged across the top end of a grip 261, and a player can selectively depress the push button switch 262 with a thumb while holding the grip 261.

Figure 22:
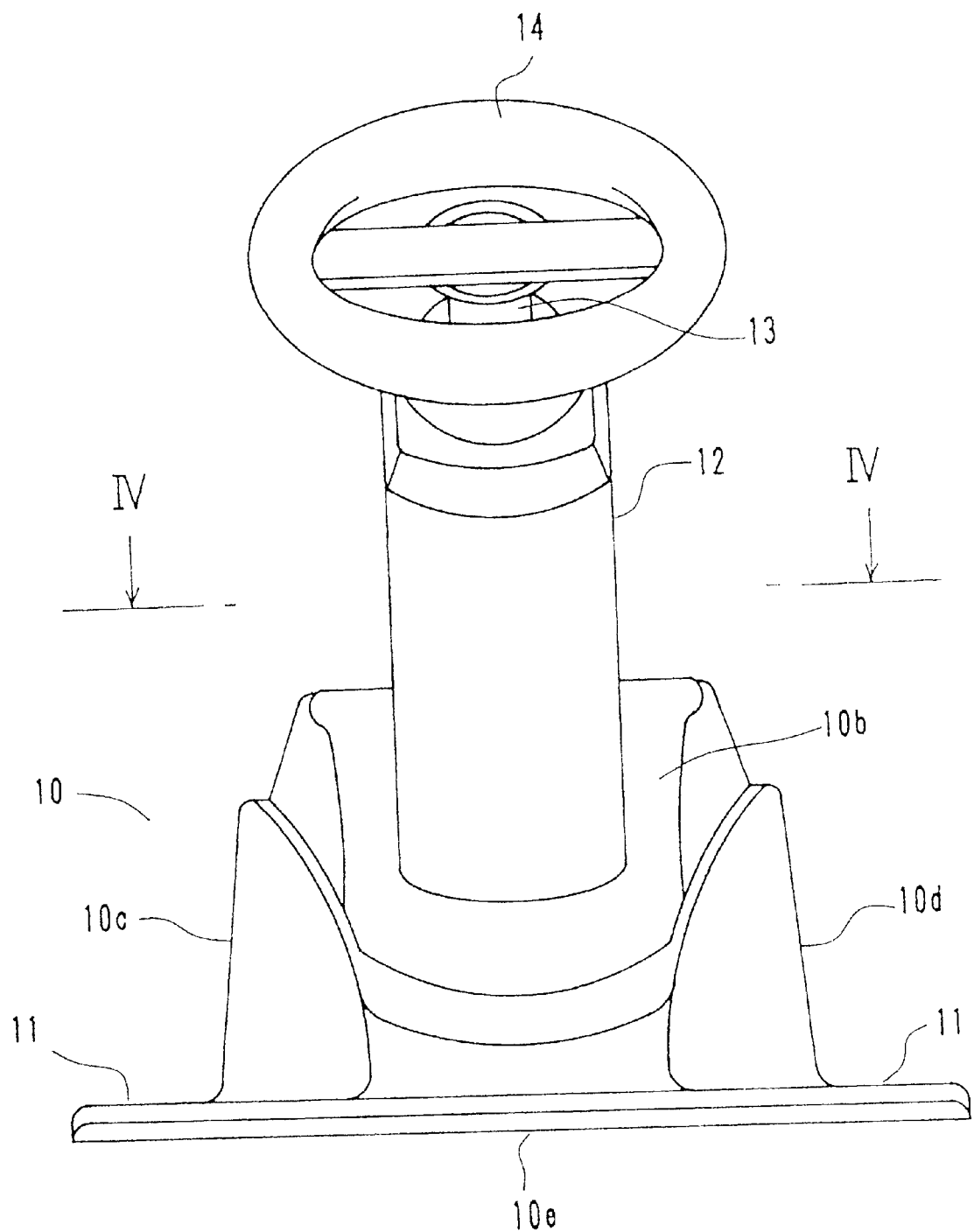
FIG. 22 is a rear view of a steering wheel control apparatus according to a further embodiment of the present invention.

A modification of the embodiment in FIG. 2 is shown in FIG. 22. Although a base casing 10 is structured the same as that in the previous embodiment, a steering wheel 14 has a simple circular shape, rather than having a shape wherein the right and the left sides of the steering wheel are symmetrically formed.

INDUSTRIAL APPLICABILITY

First, according to the present invention, a player can selectively manipulate a plurality of button switches while holding the steering wheel. The steering wheel control apparatus, therefore, possesses excellent usability, and is appropriate for television games that require quick control responses. Thus it is possible for games to provide progressively greater gratification for players as skill is acquired in their use, and the players can enjoy the games more.

A plurality of button switches are located at the front of the steering wheel and within sight of the player, so that a player can observe the manipulation of switches and can prevent errors during their operation. For a rotary steering wheel that has a pair of grip portions, the arrangement of a plurality of button switches on the grip portions can facilitate a more complex and a higher level switch manipulation.

Further, a switch that is not used during a game is located in the center, or in the vicinity of center, at the front of the steering wheel. With this arrangement, since one hand must be removed from the steering wheel in order to manipulate that switch, manipulation errors can be prevented.

Second, since a steering wheel control apparatus according to the present invention is so designed that the individual shift levers on the reverse surface of a steering handle can be operated independently, the shift lever mechanism can be compactly and simply constructed around the steering wheel, and is appropriate for employment with the steering wheel control apparatus that is to be connected to a television game machine for home use. Even in with a television game that is played at home, a player can enjoy a sense of control that is similar to that which is experienced when actually driving a racecar.

Further, when both the shift levers are being operated, electric processing is performed so that it is assumed that the control that is imposed by one of the shift levers is valid and that the result of the operation of the other is invalid. Therefore, errors that occur during the operation of the shift levers can be automatically eliminated so as to follow the desire of a player as much as possible.

Third, according to the present invention, since a player can securely hold the base casing of the steering wheel control apparatus between the thighs, and the player does not, therefore, have to be careful about shifting the steering wheel control apparatus unnecessarily while manipulating the steering wheel, the player concentrate on and fully enjoy playing the game.

A plate is extended to the right and to the left along the bottom face of the base casing. The player can hold the base casing between the thighs, and at the same time, can press down on the plate, which extends outward to either side, with the thighs from above, so that the base casing can be held more securely. With the securing mechanism, a player can manipulate the structure wherein a plurality of button switches and the shift levers are provided on the steering wheel.

Fourth, according to the present invention, when the locking means has been released, the steering column is temporarily held by the temporary holding means so that it can be inclined. The steering column is freely inclined by moving a steering wheel and can be maintained at a proper inclination. The steering wheel can be secured in an optimal inclined position by setting and locking the locking means, and such a condition that the steering wheel is easily operated at an optimal inclined position can be provided.

In addition, when the locking means is set in the lock released state, the steering shaft is temporarily held by the temporary holding means so that it can be freely extended or depressed. The steering shaft can therefore be freely extended or depressed with the steering handle and can be temporarily maintained at a desired height. When the steering shaft is locked by the locking means, the steering wheel can be fixed at an optimal vertical position for easy operation.

The inclination and the extension/depression of the steering wheel can be adjusted by the provision of the steering wheel inclination position adjustment structure and the steering wheel extension/depression position adjustment structure. The usability is therefore enhanced.

What is claimed is:

1. A steering wheel control apparatus for a game machine, which supplies a control signal to said game machine, comprising:

a rotational steering wheel having a pair of grips at symmetrically located positions to the center of rotation;

a plurality of button switches provided at positions on a front portion of said steering wheel and to which thumbs of hands holding said grips can be moved, and transmitting said control signal; and a switch arranged in a center, or near said center, of a front face of said steering wheel.

2. A steering wheel control apparatus, which supplies control signal to a game machine connected to a monitor, comprising:

a base casing;

a steering column supported by said base casing at a predetermined inclination;

a steering shaft rotatably provided to said steering column;

a steering wheel including a steering wheel center portion which is provided at a top end of said steering shaft, an upper elongating member and a lower elongating member which extend from said steering wheel center portion in right and left radial directions, and grips which are provided between said upper elongating member and said lower elongating member, wherein substantially arched openings are formed between said steering wheel center portion and said grips; and a plurality of button switches, provided on said upper face of said left and right upper elongating members and near said grips, provided within a range to which a thumb of a hand of a player holding said grip reaches, and supplying said control signal to said game machine.

3. A steering wheel control apparatus for a game machine according to claim 2, wherein:

said base casing includes sides converging along a front to rear direction and a plate extending beyond said sides in the left and right directions along the bottom surface thereof where said left and right directions are defined by a view of a user operably seated behind the steering wheel control apparatus;

whereby a player securely holds said sides of said base casing between said player's thighs, and presses down on said plate with said player's thighs from above.

4. A steering wheel control apparatus for a game machine according to claim 2, wherein said base casing rotatably supports said steering column to be inclined freely, further comprising a steering wheel position adjusting structure which includes:

temporary holding means for permitting said steering column to be rotated and for temporarily holding said steering column at a desired angle; and locking means for inhibiting the rotation of said steering column.

5. A steering wheel control apparatus for a game machine according to claim 4, wherein, in said steering wheel position adjusting structure, said temporary holding means comprises:

an external bottom wall face of said steering column is formed in a curved shape, a plurality of grooves extending toward the sides on the external bottom wall face are formed along a circumference of the face, an engagement member extending from the base casing and having an engagement protrusion at the distal end thereof which can be deplaced downward by elastic deformation is formed, and the engagement protrusion of said engagement member engages one of said grooves in said steering column so that said inclined steering column is temporarily held at the position; and said locking means comprises:

an inclination locking member is provided to the base casing, so that an active portion thereof can be freely engaged upward with and disengaged from said engagement protrusion by an operation of the inclination locking member, whereby when said active portion of said inclination locking member engages with said engagement protrusion of said engagement member, a downward displacement of said engagement protrusion is inhibited and thus said locked state is provided, and when said active portion of said inclination locking member is separated from said engagement protrusion, said downward displacement of said engagement protrusion is permitted and thus a lock released state is provided.

6. A steering wheel control apparatus for a game machine according to claim 2, further comprising a steering wheel position adjusting structure which includes:

temporary holding means for permitting said steering shaft to be extended or depressed and for temporarily holding said steering shaft at a desired position; and locking means for inhibiting said steering shaft from being extended or depressed.

7. A steering wheel control apparatus for a game machine according to claim 6, wherein, in said steering wheel control position adjusting structure, said temporary holding means comprises:

a plurality of grooves extending in a direction vertical to an axial direction of said steering shaft are formed on a surface of said steering shaft and along the axial direction, a cylindrical engagement member is provided, said cylindrical engagement member being inserted extendingly or depressingly along the axial direction by the steering shaft, being rotated together therewith, and having an engagement piece which includes an engagement pawl whose distal end is bent inward, said engagement piece being displaced by elastic deformation thereof in a direction of the greatest diameter of the cylindrical engagement member, whereby, when said engagement pawl engages with one of said grooves in said steering shaft, said extension/depression position of said steering shaft is temporarily determined; and said locking means comprises:

a circular extension/depression locking member rotatably engaging with an end of said cylindrical engagement member is provided and is so operated that operating portion thereof externally contacts to, or separates from, said engagement piece of said engagement member, said cylindrical engagement member is rotatably supported by said steering column, whereby when said operating portion of said extension/depression locking member contacts said engagement piece of said engagement member, an expansion of said diameter of said engagement piece is inhibited and a locked state is provided, and when said operating portion of said extension/depression locking member separates from said engagement piece of said engagement member, said expansion of said diameter of said engagement piece is permitted and an unlocked state is provided.

8. A steering wheel control apparatus, for a game machine, which supplies a control signal to said game machine, comprising:

a pair of grip portions positioned at predetermined right and left locations on a steering wheel; and a pair of shift levers provided at a reverse surface of said steering wheel, said pair of shift levers having manipulable segments near said grip portions and being independently operated when fingers of both hands holding said pair of grip portions contact said manipulable segment, wherein a signal to shift up is generated by the operation of one of said shift levers and a signal to shift down is generated by the operation of said other shift lever.

9. A steering wheel control apparatus for a game machine according to claim 8, wherein said shift levers have a base supported at a rotation center of said steering wheel, extend toward said grip portions, and have said manipulable segments at distal ends thereof positioned near said grip portions to serve as floating active points.

10. A steering wheel control apparatus for a game machine according to claim 8, further comprising:
    a signal processing means for processing signals from said shift levers so that, when both said shift levers are being operated, one of said shift lever operations is valid and the other shift lever operation is invalid.

11. A steering wheel control apparatus, which supplies control signal to a game machine connected to a monitor, comprising:
    a base casing;
    a steering column rotatably supported by said base casing at a predetermined inclination;
    a steering shaft rotably provided to said steering column;
    a steering wheel including a steering wheel center portion provided at a top end of said steering shaft, an upper post and a lower post and a lower post extending from said steering wheel center portion in right and left radial directions, and grips provided between said upper post and said lower post, substantially arched openings being formed between said steering wheel center portion and said grips, said steering wheel being constituted by an upper casing and a lower casing; and
    a right and left operation member rotatably supported, between the upper and lower casings, by shafts at a center of said upper and said lower casings, and being integrally formed for a center portion rotatably supported and right and left manipulable segments which are extended toward said grips and positioned near said grips and in said substantially arched openings, wherein right and left operation member lever controls right and left switches in said steering wheel by being pulled up with fingers of said right and left hands holding said grips.

12. A steering wheel control apparatus, which supplies control signal to a game machine, comprising:
    a base casing rotatably supporting a steering shaft of a steering wheel, said base casing having sides which converge along a front to rear direction so that said sides can be easily held between player's thighs.

13. A steering wheel control apparatus for a game machine according to claim 12, wherein a plate is extended to the right and to the left along said bottom face of said base casing where said left and right directions are defined by a view of a user operably seated behind the steering wheel control apparatus.

14. A steering wheel position adjusting structure for a steering wheel control apparatus for a game machine that supplies control signals to said game machine, comprising:
    a steering column for rotatably supporting a steering wheel;
    a base casing for rotatably supporting said steering column to be inclined;
    steering column temporary inclination holding means for permitting said steering column to be rotated and for temporarily holding said steering column at a desired position; and
    steering column inclination locking means for inhibiting the rotation of said steering column.

15. A steering wheel control apparatus for a game machine, according to claim 14, wherein said steering column temporary inclination holding means comprises:
    an external bottom wall face of said steering column is formed in a curved shape, a plurality of grooves extending toward the sides in the external bottom wall face are formed along a circumference of the face, an engagement member extending from the base casing and having an engagement protrusion at the distal end thereof which can be deplaced downward by elastic deformation is formed, and the engagement protrusion of said engagement member engages one of said grooves in said steering column so that said inclined steering column is temporarily held at the position; and
    said steering column inclination locking means comprises:
    an inclination locking member is provided to the base casing, so that an active portion thereof can be freely engaged upward with and disengaged from said engagement protrusion by an operation of the inclination locking member,
    whereby when said active portion of said inclination locking member engages with said engagement protrusion of said engagement member, a downward displacement of said engagement protrusion is inhibited and thus said locked state is provided, and when said active portion of said inclination locking member is separated from said engagement protrusion, said downward displacement of said engagement protrusion is permitted and thus a lock released state is provided.

16. A steering wheel control apparatus for a game machine, according to claim 15, wherein said external bottom wall face of said steering column is formed in substantially a wave shape due to the provision of said plurality of grooves.

17. A steering wheel control apparatus for a game machine according to claim 14, further comprising:
    a pair of grip portions positioned at predetermined right and left locations on a steering wheel; and
    a pair of shift levers provided at a reverse surface of said steering wheel, said pair of shift levers having manipulable segments near said grip portions and being independently operated when fingers of both hands holding said pair of grip portions contact said manipulable segment,
    wherein a signal to shift up is generated by the operation of one of said shift levers and a signal to shift down is generated by the operation of said other shift lever.

18. A steering wheel control apparatus for a game machine according to claim 14, wherein said base casing which converge along a front to rear direction.

19. A steering wheel control apparatus for a game machine that supplies control signals to said game machine, comprising:
    steering column temporary extension holding means for permitting said steering shaft to be extended or depressed and for temporarily holding said steering shaft at a desired position; and
    steering column extension locking means for inhibiting said steering shaft from being extended or depressed.

20. A steering wheel control apparatus for a game machine according to claim 19, wherein:
    said steering column temporary extension holding means comprises:
    a plurality of grooves extending in a direction vertical to an axial direction of said steering shaft are formed on a surface of said steering shaft and along the axial direction, a cylindrical engagement member is provided, said cylindrical engagement member being inserted extendingly or depressingly along the axial direction by the steering shaft, being rotated together therewith, and having an engagement piece which includes an engagement pawl whose distal end is bent inward, said engagement piece being displaced by elastic deformation thereof in a direction of the greatest diameter of the cylindrical engagement member, whereby, when said engagement pawl engages with one of said grooves in said steering shaft, said extension/depression position of said steering shaft is temporarily determined; and said steering column extension locking means comprises:

a circular extension/depression locking member rotatably engaging with an end of said cylindrical engagement member is provided and is so operated that operating portion thereof externally contacts to, or separates from, said engagement piece of said engagement member, said cylindrical engagement member is rotatably supported by said steering column, whereby when said operating portion of said extension/depression locking member contacts said engagement piece of said engagement member, an expansion of said diameter of said engagement piece is inhibited and a locked state is provided, and when said operating portion of said extension/depression locking member separates from said engagement piece of said engagement member, said expansion of said diameter of said engagement piece is permitted and an unlocked state is provided.

21. A steering wheel control apparatus for a game machine according to claim 19, further comprising:

a pair of grip portions positioned at predetermined right and left locations on a steering wheel; and a pair of shift levers provided at a reverse surface of said steering wheel, said pair of shift levers having manipulable segments near said grip portions and being independently operated when fingers of both hands holding said pair of grip portions contact said manipulable segment, wherein a signal to shift up is generated by the operation of one of said shift levers and a signal to shift down is generated by the operation of said other shift lever.

22. A steering wheel control apparatus for a game machine according to claim 19, wherein a base casing rotatably supporting said steering shaft has sides which converge along a front to rear direction.

23. A steering wheel control apparatus, for a game machine, comprising:

said steering wheel inclination position adjusting structure according to claim 14, and said steering wheel extension/depression position adjusting structure according to claim 19.

24. A steering wheel control apparatus, for a game machine, comprising:

said steering wheel inclination position adjusting structure according to claim 15; and said steering, wheel extension/depression position adjusting structure according to claim 20.

25. A steering wheel control apparatus for a game machine according to claim 9, further comprising:

a signal processing means for processing signals from said shift lever so that, when both said shift levers are being operated, one of said shift lever operations is valid and the other shift lever operation is invalid.

26. A steering wheel control apparatus for a game machine, which supplies a control signal to said game machine, comprising:

a base casing;

a steering column supported by said base casing at a predetermined inclination;

a steering shaft rotatably provided to said steering column;

a steering wheel including a steering wheel center portion which is provided at a top end of the steering shaft and right and left grips provided through extending from the steering wheel center portion wherein substantially arched openings are formed between said steering wheel center portion and said grips;

a plurality of upper-face operation means, provided at an upper-face side of the steering wheel center portion and at a near side of the grips to which the hands of the player holding each grip can reach, for supplying said control signals to the game machine; and back-face operation means, provided at a back-face side of the steering wheel center portion and at a near side of the grips to which the hands of the player holding each grip can reach, for supplying said control signals to the game machine.

27. A steering wheel control apparatus for a game machine, which supplies a control signal to said game machine, comprising:

a base casing;

a steering column supported by said base casing at a predetermined inclination;

a steering shaft rotatably provided to said steering column, a steering wheel including a steering wheel center portion which is provided at a top end of the steering shaft and right and left grips provided through extending from the steering wheel center portion;

a cylinder rotatable together with the steering shaft and provided in the steering column; and a spring provided around the cylinder and having an upper terminal and a lower terminal which are abutted between an upper protrusion and a lower protrusion provided to the surface of the cylinder and to an upper stopper and a lower stopper provided to the interface of the steering column;

whereby when the steering wheel is rotated clockwise or counterclockwise, the steering wheel has a centering function for returning to the other direction through an elasticity of the spring generated between the upper protrusion and the lower stopper or between the lower protrusion and the upper stopper.

28. The steering wheel control apparatus as recited in claim 27 further comprising button means on said steering wheel for supplying control signals to said game machine.

29. The steering wheel control apparatus as recited in claim 27 further comprising an operation member operably disposed on said steering wheel between the center portion and one of the left and right grips, said supplying signals to said game machine.

30. The steering wheel control apparatus as recited in claim 29 further comprising button means on said steering wheel for supplying control signals to said game machine.

31. The steering wheel control apparatus as recited in claim 27 further comprising means for adjustably inclining said steering column with respect to said base casing, and further comprising means for locking said steering column in a selected inclined position.

32. The steering wheel control apparatus as recited in claim 27 further comprising means for adjustably extending said steering column with respect to said base casing, and further comprising means for locking said steering column in a selected extended position.

33. A steering wheel control apparatus, which supplies control signals to a game machine connected to a monitor, comprising:

a base casing;

a steering column supported by said base casing at a predetermined inclination;

a steering shaft rotatably provided to said steering column;

a steering wheel including a steering wheel center portion which is provided at a top end of said steering shaft, an upper elongating member and a lower elongating member which extend from said steering wheel center portion in right and left radial directions, and grips which are provided between said upper elongating member and said lower elongating member, wherein substantially arched openings are formed between said steering wheel center portion and said grips;

a plurality of button switches, provided on said upper face of said left and right upper elongating members and near said grips, provided within a range to which a thumb of a hand of a player holding said grip reaches, and supplying said control signals to said game machine; and right and left operation member provided at a reverse side of said steering wheel having right and left operation portions which are near said right and left grips so that a finger of a player holding said grip reaches thereto, and supplying said control signals to said game machine.

34. A steering wheel control apparatus, which supplies control signal to a game machine, comprising:

a base casing rotatably supporting a steering shaft of a steering wheel, said base casing having sides which converge along a front to rear direction so that said sides can be easily held between player's thighs;

a pair of grip portions positioned at predetermined right and left locations on a steering wheel; and a pair of operation members provided at a reverse side of said steering wheel, and having manipulable segments near said pair of grip portions, so as to supply predetermined control signals to said television game machine by an operation to said manipulable segment with fingers of right and left hands holding said grip portions.

35. A steering wheel control apparatus for a game machine according to claim 33, wherein:

said steering wheel is constituted by an upper casing and lower casing;

the right and left operation member is provided between said upper and lower casings and rotatably supported by shaft support portions provided at a center of the upper and lower casings, wherein the right and left operation member includes a center portion supported by the shafts support portions, and right and left operating portions extended toward said grips and positioned near said grips and in said openings, and said center portion and said right and left operating portion are integrally formed; and said right and left operation member controls right and left switches in said steering wheel by being pulled up with fingers of said right and left hands holding said grips.

* * * * *